United States Patent
Fransen

(10) Patent No.: US 10,133,751 B2
(45) Date of Patent: Nov. 20, 2018

(54) FACILITATING LOCATION-AWARE ANALYSIS

(71) Applicant: Adobe Systems Incorporated, San Jose, CA (US)

(72) Inventor: Peter Raymond Fransen, Soquel, CA (US)

(73) Assignee: Adobe Systems Incorporated, San Jose, CA (US)

( * ) Notice: Subject to any disclaimer, the term of this patent is extended or adjusted under 35 U.S.C. 154(b) by 230 days.

(21) Appl. No.: 15/217,592

(22) Filed: Jul. 22, 2016

(65) Prior Publication Data

US 2018/0025028 A1 Jan. 25, 2018

(51) Int. Cl.
*G06F 17/30* (2006.01)

(52) U.S. Cl.
CPC .. *G06F 17/30241* (2013.01); *G06F 17/30289* (2013.01)

(58) Field of Classification Search
CPC .............. G06F 17/30241; G06F 17/30289
See application file for complete search history.

(56) References Cited

U.S. PATENT DOCUMENTS 8,798,918 B2* 8/2014 Onishi ............... G01C 21/3476
                                                    701/420
2005/0251331 A1* 11/2005 Kreft ................... G01C 3/08
                                                    701/438

OTHER PUBLICATIONS

"SQLite", Retrieved at: https://www.sqlite.org/ on May 5, 2016, 1 page.
"Calculate distance, bearing and more between Latitude/Longitude points", Retrieved at: http://www.movable-type.co.uk/scripts/latlong.html, on May 5, 2016, 17 pages.
"Haversine formula—Wikipedia", Retrieved at: https://en.wikipedia.org/wiki/Haversine_formula, on May 5, 2016, 3 pages.
"Quadtree—Wikipedia", Retrieved at: https://en.wikipedia.org/wiki/Quadtree on May 5, 2016, 5 pages.
"Geographic coordinate conversion—Wikipedia", Retrieved at: https://en.wikipedia.org/wiki/Geographic_coordinate_conversion, on May 5, 2016, 8 pages.

* cited by examiner

*Primary Examiner* — Greta L Robinson
(74) *Attorney, Agent, or Firm* — Wolfe-SBMC

(57) ABSTRACT

Facilitating location-aware analysis is described. In some embodiments, a database building module is configured to build a point of interest (POI) database based on a tree data structure that includes multiple nodes respectively corresponding to multiple areas. The database building module includes a content node processing module that inserts an entry in the POI database having a content field populated by a POI descriptor included with a content node. The database building module also includes a reference node processing module that inserts an entry having multiple reference fields respectively populated with area indicators corresponding to multiple subnodes of a reference node. In other embodiments, a POI database search module is configured to search a POI database to ascertain multiple POIs with regard to a location of a computing device. The search module searches key fields of reference entries and content entries using an area indicator matching the computing device's location.

20 Claims, 16 Drawing Sheets

FACILITATING LOCATION-AWARE ANALYSIS

BACKGROUND

Location-based services involve providing information, application features, or options that are tailored to a current location of an end user. To implement a location-based service, a location-aware analysis is performed to link a location of the end user and a location of another entity, such as a point of interest (POI), involved in the location-based service. Generally, a location-aware analysis entails determining a distance between the end user and a POI or determining relative proximities between the end user and multiple different POIs. Thus, a location-aware analysis typically utilizes two pieces of information: a location of the end user and a location of at least one POI. The location of the end user can be determined by an end-user device on an individual basis using e.g. global positioning system (GPS) technology.

The location of the POI, however, can be more difficult to determine, especially from the perspective of the end-user device. POIs may number in the hundreds, thousands, or even millions. End-user devices, particularly mobile ones like smart phones, have constrained processing, memory, and power resources. These constrained resources render infeasible a determination by a mobile device of a location of a proximate POI from among a multitude of POIs. Data centers, however, have access to thousands of server devices and can handle the processing, memory, and power demands to perform real-time location-aware analyses involving even millions of POIs. Thus, an end-user device may need to communicate with a cloud-based information system to obtain the location of proximate POIs. The results of a given location-aware analysis, such as a listing of proximate or relevant POIs, can then be downloaded to an end-user device for use in providing a location-based service.

This cloud-oriented model can provide satisfactory performance for providing location-based services if a number of conditions are all present. First, a connection should be maintainable essentially constantly between the end-user device and the cloud-based functionality. Second, the connection should have sufficient bandwidth to download to the end-user device the results of the location-aware analysis. Third, use of the connection should not be unduly costly for the end user. Unfortunately, this cloud-oriented model breaks down in a mobile environment because any of these three conditions can fail in a wireless connection scenario. First, wireless connectivity is not guaranteed. Also, wireless connections generally offer lower bandwidth as compared to wired connections. Furthermore, most cellular connections are metered such that each byte of data directly or indirectly incurs some cost to the end user.

Consequently, it can be difficult to deliver location-based services to the very devices that can benefit most from such services, namely mobile devices. On the one hand, a mobile device is too resource constrained to be capable of effectively handling the demands of processing relevant information about the multitude of POIs that are potentially involved in a location-aware analysis, especially without adversely impacting an end user's ability to utilize the mobile device for other purposes. On the other hand, when a mobile device is in motion and location-based services are therefore more likely to be pertinent, the mobile device may be unable to secure a sufficiently reliable wireless connection to enable the results of a cloud-oriented location-aware analysis to be provided to the mobile device, especially in a timely manner.

SUMMARY

Facilitating location-aware analysis is described. Techniques and systems described herein enable a location-aware analysis to be performed on an end-user device, such as a mobile device with constrained resources. A location-aware analysis pertains to a location of the end-user device and multiple points of interest (POIs). In some example embodiments, a data center produces a persistent, compact database that organizes the multiple POIs based on location such that end-user devices are capable of utilizing the POI database for location-aware analyses. The data center first constructs an in-memory tree data structure having nodes corresponding to area indictors and having references that point to subnodes, but this in-memory tree data structure is too large and complex to be manageable by a resource-constrained device. The data center constructs the tree data structure so as to encode spatial groupings of the POIs into the organization of the nodes, which correspond to areas, and the inter-nodal pointers, which correspond to increasingly smaller subareas. The data center then builds a POI database that maintains the POI groupings by spatial area and preserves the linkages to increasingly smaller subareas. To build the POI database, nodes are extracted from the tree data structure and converted into respective entries of the database using the area indicators to reproduce the pointer structure of the tree. Self-referencing values link one entry corresponding to one area to multiple entries that respectively correspond to multiple subareas of the area. This POI database occupies less memory than the tree data structure and is persistent so as to be capable of being transmitted over a network to an end-user device. In other example embodiments, an end-user device can store and query the POI database with a reasonable level of resource consumption using the area indicators. Increasingly smaller subareas can be determined with repeated inquiries to the POI database using different area indicators as a key search term.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description.

DETAILED DESCRIPTION

Overview

Figure 1:
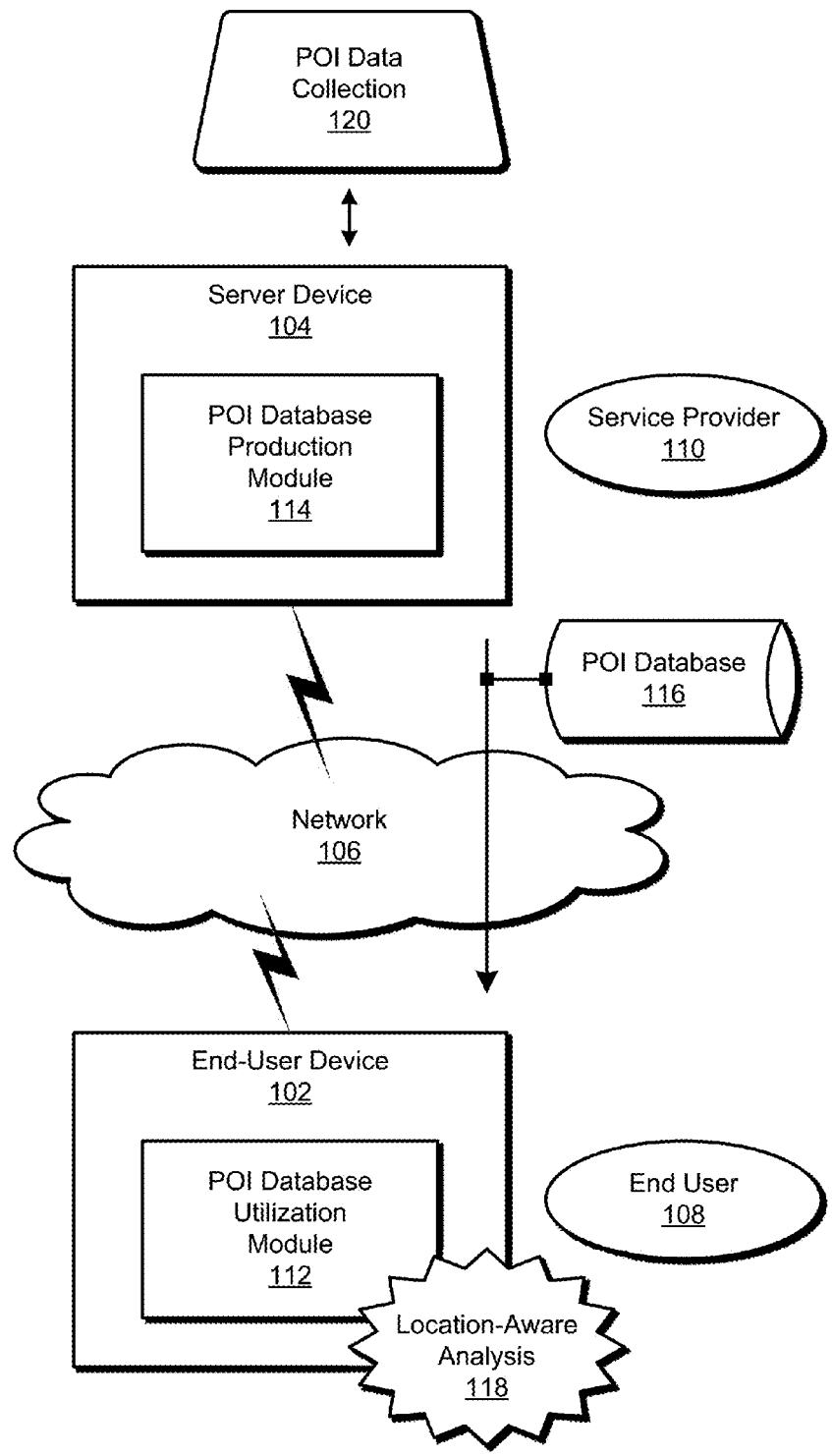
FIG. 1 illustrates an environment including a server device and an end-user device for example embodiments that are operable to facilitate location-aware analysis.

A location-aware analysis is conducted with respect to an end-user device in relation to a multitude of potentially-relevant entities. Hereinafter, entities are referred to as points of interest (POIs). POIs are destinations, attractions, neighborhoods, and so forth that are distributed at different locations across a real or virtual space. Metadata related to a given POI can be associated with the POI in a POI descriptor. The metadata can be used for various marketing capabilities with regard to an end user's current or past location. Given that consistent network connectivity is not guaranteed for end-user devices, server-side processing of POI metadata cannot be relied on to enable real-time, location-aware marketing activity. Instead, to support real-time marketing activity on an end-user device, at least a subset of the POI metadata is cached on the client side. To meet both the expectations of marketers and the demands of consumers carrying end-user devices, the searching of a client-side POI metadata cache should be both speedy and resource sensitive when ascertaining an end user's proximity to a POI or a group of POIs. To be sensitive to the resources of end-user devices, a small percentage or amount of device resources, such as memory, processing time, and battery power, should be consumed by the searching of the POI metadata cache.

Techniques and systems described herein enable a location-aware analysis to be performed on an end-user device, including a mobile device with constrained resources. A persistent, compact database that organizes POIs based on location is built in the cloud and downloaded to end-user devices. The POI database is configured to enable an end-user device to ascertain POIs that are sufficiently proximate to the end-user device so as to be potentially relevant to a location-aware analysis. In some usage scenarios, an end-user device can search a POI database having hundreds of thousands of POIs to ascertain those POIs that are potentially-relevant to a location-aware analysis with fewer than ten database queries.

In example embodiments, a location-aware analysis is to be performed with regard to an end-user device in relation to multiple POIs. The location-aware analysis entails determining distances or at least relative proximities between the end-user device and the multiple POIs. Each of the multiple POIs is situated at some location across a space that can be segmented into areas. A cloud-based system organizes the multiple POIs based on the locations of the POIs into increasingly smaller areas using a tree data structure having multiple nodes. The cloud-based system then converts the tree data structure into a POI database covering the multiple POIs while preserving the location-based organization. The cloud-based system disseminates the POI database to end-user devices. The end-user devices utilize the POI database to search for POIs that are proximate to a current location of the end-user device. A list of proximate POIs can be refined for a more precise location-aware analysis or to provide a location-based service.

In some implementations, the space over which the POIs are distributed comprises at least a portion of the earth. If the earth is the real space over which the POIs are distributed, the locations of the POIs are represented in terms of geospatial coordinates, such as longitude and latitude. The tree data structure is implemented as a quadtree data structure in which each node that has at least one subnode has four subnodes. Each POI is represented by a POI descriptor, which includes a POI location indicative of a site at which the POI is situated on the earth. To accommodate a quadtree data structure, the earth is segmented into smaller and smaller subareas that are effectively quadrants of a larger area as the POIs are incorporated into the quadtree data structure. Accordingly, this overview is presented for a quadtree data structure implementation in which each area is termed a quadrant. Each time a given quadrant is assigned a threshold number of POIs, such as 100 POIs, the quadrant is segmented into four smaller quadrants, or sub-quadrants, so that no quadrant is assigned an overwhelming number of POIs.

A POI quadtree data structure includes multiple nodes, with each node corresponding to a quadrant. A given node corresponding to a given quadrant includes four references that point to four subnodes that correspond to four sub-quadrants of the given quadrant. Nodes having references are referred to herein as reference nodes. Alternatively, if a particular quadrant has no sub-quadrants, the node corresponding to the particular quadrant includes nodal content in the form of multiple POI descriptors of POIs that are situated in the particular quadrant. Nodes having nodal content are referred to herein as content nodes. For both reference nodes and content nodes, a node includes a quadrant indicator for the quadrant to which the node corresponds. The quadrant indicator represents the quadrant and also indicates a location of the quadrant, such as by describing a boundary of the quadrant. Using an object for each node of the POI quadtree and pointers as references to sub-objects, a POI quadtree data structure is realized in an operational memory. The operational memory, such as dynamic random access memory (DRAM) or static random access memory (SRAM), is capable of handling the objects and the pointers between linked objects.

To construct a POI quadtree data structure, a POI tree construction module at a data center instantiates a root node that corresponds to an entirety of the earth. POI descriptors are added to the root node from a POI data collection until a threshold number of POIs have been added. Once the threshold number is reached, the earth is segmented into four quadrants, and four subnodes are instantiated that correspond respectively to the four quadrants. The POI tree construction module also adds four references to the root node that respectively point to the four subnodes to thereby make the root node a reference node. Based on the locations of the POIs, the POI descriptors from the root node are redistributed into one of the four subnodes that correspond to the four quadrants. The POI tree construction module continues to incorporate more POI descriptors from the POI data collection into the POI quadtree data structure. Each time a given node corresponding to a given quadrant reaches the threshold number of POIs, four subnodes are added to the POI quadtree. The POIs in the given node are redistributed to the four subnodes, which correspond to four sub-quadrants of the given quadrant. The leaves of the POI quadtree data structure each include POI descriptors and are therefore called content nodes.

The completed POI quadtree data structure can be efficiently searched to ascertain POIs that are more proximate to a location of an end-user device than are other POIs. The searching of the POI quadtree data structure is efficient because each time a pointer is traversed between a parent node and a child node the search field is narrowed by 75%. Unfortunately, construction of the POI quadtree data structure is a resource-intensive exercise in terms of processing functionality, power consumption, and time. Moreover, the POI quadtree data structure is too large to be retained in the operational memory of a resource-constrained mobile device. Accordingly, the POI quadtree data structure is converted to a POI database that occupies less memory and that can be persisted to storage memory, such as disk or flash memory. The conversion preserves the efficient search capability by enabling the search field to be narrowed by 75% with each database query. Furthermore, in contrast with the POI quadtree data structure, a server device of a data center can transmit the persistent POI database to end-user devices. Consequently, the POI database can be efficiently searched by resource-constrained devices.

A POI database building module of a data center obtains a node of a POI quadtree data structure and converts the nodal information, including references to other nodes—if any, into an entry of the POI database. Thus, a root entry of the database for the root node of the quadtree data structure corresponds to the entirety of the earth (or selected portion thereof), and each other entry corresponds to an increasingly smaller quadrant. Each node of the POI quadtree data structure is considered to be represented by a quadrant indicator that provides a description of a boundary of the corresponding quadrant. For example, a quadrant indicator can include coordinates of a point of the quadrant and distance measurements, such as height and width, that jointly establish the size of the quadrant in relation to the coordinate point. Each entry of the POI database includes a searchable key field that is unique for a table of the POI database. To insert an entry in the database, the POI database building module populates a key field of the entry with the quadrant indicator of the node being converted to the database entry.

If a node obtained from a POI quadtree data structure is a content node, a content node processing module populates a content field of the database entry with the POI descriptors of the obtained node. On the other hand, if an obtained node is a reference node, a reference node processing module populates four reference fields of the database entry based on the references of the obtained reference node. A respective quadrant indicator corresponding to each subnode pointed to by a respective reference of the obtained reference node is placed in a respective reference field of the database entry for the obtained reference node. The node processing to convert each node to a database entry proceeds recursively down the limbs of the tree and across the overall tree data structure until the POI database is built.

In this manner, the POI quadtree data structure can be persisted as a POI database. Moreover, the quadtree organization of the nodes in the quadtree data structure, which provides a relative spatial grouping of the POIs, is preserved by converting the inter-nodal reference pointers of the quadtree data structure into values populating reference fields of the database entries that self-reference other entries of the POI database. A POI service management module at a server device disseminates the POI database to a POI service interaction module at each of multiple end-user devices.

At the end-user devices, the POI database can be searched to ascertain POIs that are proximate to a current location of an end-user device. In operation, a POI database search module of an end-user device obtains a location of the end-user device. The location of the end-user device may be established using a bounding box to account for expansive sizes of POIs or for a size of a range that can be traveled by the end-user device within some time period. A match determination module initially queries the POI database for the root entry corresponding to the root node of the POI tree data structure. The match determination module compares the location of the end-user device to the quadrant indicator populating each of the four reference fields of the root entry to look for at least one match, with each quadrant indicator representing a respective boundary of a sub-quadrant. A match is determined if the location of the end-user device intersects the boundary, such as by being at least partially present within the boundary.

A key field search module searches the key fields of the entries of the POI database using the matching quadrant indicator as the primary key search term. For example, the key field search module queries the POI database to retrieve the entry having the matching quadrant indicator in the key field thereof. This new entry covers one-fourth of the area of the previous entry. The new entry is analyzed to determine if the entry includes values in reference fields or values in a content field. If the new entry is a reference entry, the match determination module operates to determine a new reference field having a new quadrant indicator that matches the location of the end-user device. The new quadrant indicator is then used by the key field search module to find an entry having a key field matching the new quadrant indicator. The querying of the database and the following of the self-referential fields continues until a content entry having items in a content field is reached, which content entry corresponds to a content node at a leaf of the POI quadtree data structure.

A content field parser module extracts POI descriptors from the content field of the content entry. Based on the tree-to-database conversion process described above, the number of extracted POI descriptors is less than the threshold number permitted in each node of the POI quadtree data structure. If the location of the end-user device matched two reference fields of any single database entry during the searching, another chain of database queries may be followed to ultimately extract another group of POI descriptors. After the potentially-relevant POIs are ascertained by extracting POI descriptors, a POI relevance analysis module determines a relevance of each POI. The respective relevance of each POI can be based, for example, on a distance between the end-user device and the respective POI. The distance can be determined using, for instance, the haversine formula. After a relevance has been ascribed to each extracted POI descriptor, or as part of the relevance analysis, the POIs are ranked based on the relevance.

A POI reporting module provides a report of the ranked POIs, such as the most relevant 20 POIs, based on proximity or one or more other filtering parameters. The POI reporting module reports the POIs to another module or application executing on the end-user device or to a marketing application in the cloud. Alternatively, the POI reporting module can report the POIs to the end-user. For example, the relevant POIs can be presented to a user visually in list form or as depicted on a map relative to a current location of the end-user device.

In these manners, location-aware analysis is facilitated by providing to end-user devices a persistent POI database that can be searched efficiently, including while an end-user device is offline. To do so, POIs are spatially organized by location into groups by constructing an in-memory tree data structure. The tree data structure can be traversed from a root node to a leaf node at a rate that is dependent on a number of subnodes per node so as to focus on an area having a group of POIs that are proximate to a location of an end-user device. The spatial organization is preserved during the conversion of the tree data structure to the persistent POI database. Thus, the end-user device can ascertain potentially-relevant POIs from the POI database by making relatively few queries as each query result significantly narrows the remaining area to be searched.

In the following discussion, after some example terminology is set forth, an example environment is described that may employ the techniques described herein. Example embodiments of systems, apparatuses, and approaches are then described, followed by a section explaining example procedural embodiments. The procedures may be performed in the example environment and systems as well as in other environments. However, performance of the example procedures is not limited to the example environment, and the example environment and systems are not limited to performance of the example procedures.

Terminology Examples

Example descriptions or explanations of certain terms as used herein are set forth below. Each term is applicable to one or more, but not necessarily all, embodiments presented herein. Some terms are further elucidated using one or more examples.

An "area" refers to a portion of a real or virtual space. The space may be segmented into increasingly smaller areas. A given area is segmented into two or more areas that are called subareas with respect to the given area. An example of an area is a quadrant, and an example of a subarea is sub-quadrant. For instance, a rectangular area of the earth may be segmented into four equal-sized rectangular subareas.

An "area indicator" refers to one or more values that represent a corresponding area. The area indicator specifies a location of the corresponding area. For example, an area indicator can describe a boundary of the corresponding area. An area indicator may comprise, for instance, a string that includes at least one coordinate point that is part of the area and at least one other value indicative of a size of the area, such as a diagonal coordinate or length and width measurements.

A "point of interest" or "POI" refers to a destination, an attraction, a neighborhood, a region of land, and so forth that is situated at some location across a real or virtual space. Examples of POIs include stores, restaurants, parks, gas stations, a friend's house, an amusement park ride, a commercial district, a stadium, a museum, a painting in a museum, and a historical marker. A POI is typically fixed but can be mobile, especially if a current location thereof is determinable. POIs may exist in the physical world or in a gaming or artificial reality.

A "POI descriptor" refers to a set of characteristics describing a POI. A POI descriptor can include a location of the POI, a name of the POI, a description of the POI, and so forth. The location of the POI can include a position of the POI and a size indicator, such as a radius from the POI position.

A "tree data structure" refers to an in-memory data structure having multiple nodes that are inter-linked by pointer references. A tree data structure can be constructed using, for example, an object for each node, with each non-terminating object being linked by pointers to other objects to form a linked list. The tree data structure is maintained in operational memory such that pointers can be traversed between parent and child objects. The tree data structure includes a root node, multiple intermediate nodes, and multiple leaf nodes that terminate branches of the tree. An example of a tree data structure is a quadtree data structure in which each parent node points to four child nodes.

A "node" refers to a part of a tree data structure that corresponds to an area. The node includes an area indicator for the corresponding area. Each node includes nodal content having multiple POI descriptors or includes two or more references to subnodes. A "subnode" refers to those nodes that are pointed to by the references of another node. A subnode is also referred to herein as a child node with respect to other, parent node.

A "reference" refers to a part of a node that includes a pointer or that links to a subnode. "Nodal content" refers to a part of a node that includes a data payload, such as one or more POI descriptors. A "reference node" refers to a node having at least one reference. A "content node" refers to a node that includes nodal content.

A "POI database" refers to database, such as a relational database, that stores information about POIs using a search-friendly configuration. A database serves as a persistent form of maintaining data that is suitable for retaining in storage memory or transmitting over a network link. A database includes multiple entries, such as multiple rows of a tabular database.

An "entry" refers to an atomic portion of a POI database. Each entry corresponds to, and is derived from, a node of a tree data structure. Each entry therefore also corresponds to an area. An entry includes multiple fields, such as a key field having a primary key for the entry. Each entry also includes multiple reference fields or at least one content field. A "reference entry" refers to an entry of a POI database having multiple reference fields. A reference entry is created based on a reference node. A "content entry" refers to an entry of a POI database having a content field. A content entry is created based on a content node.

A "field" refers to a unit of a database entry having at least one value. Examples of fields include key fields, reference fields, and content fields. A "key field" refers to a field of a database entry that is populated with an area indicator of the corresponding node. A POI database can be queried based at least on the values in the key fields. A "reference field" refers to a field of a database entry that is populated with an area indicator of a subnode that is referenced by the node corresponding to the database entry. A "content field" refers to a field of a database entry that is populated with at least one POI descriptor extracted from nodal content of the node corresponding to the database entry.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this written description.

Example Environment

FIG. 1 illustrates an environment 100 including a server device 104 and an end-user device 102 for example embodiments that are operable to facilitate location-aware analysis. As depicted from top to bottom, the example environment 100 includes at least one point of interest (POI) data collection 120, at least one service provider 110, at least one server device 104, at least one network 106, at least one end-user device 102, and at least one end user 108. The end-user device 102 includes a POI database utilization module 112, and the server device 104 includes a POI database production module 114. The environment 100 also includes a POI database 116 that is depicted in transit between the server device 104 and the end-user device 102.

In one or more embodiments, the POI database production module 114 constructs a tree data structure based on the POI data collection 120 at the server device 104. The POI database production module 114 uses the tree data structure to build the POI database 116. From the server device 104, the POI database production module 114 transmits the POI database 116 to the POI database utilization module 112 via the network 106. At the end-user device 102, the POI database utilization module 112 uses the POI database 116 to perform a location-aware analysis 118. An example scheme or scenario for the acquisition of the POI data collection 120, the construction of the tree data structure, the building of the POI database 116, and the utilization of the POI database 116 is described with reference to FIG. 2. The POI database production module 114 is described below with reference to FIG. 8. The POI database utilization module 112 is described below with reference to FIG. 9. Additionally, the POI database production module 114 may be fully or partially implemented as a web or cloud-based service as described below with reference to FIG. 16.

The POI database utilization module 112 and the POI database production module 114 represent functionality to implement the techniques and technologies described herein. The modules may be implemented as at least part of a software package that executes on and specially configures one or more processors, which processors may be part of a computing device; as a hardware apparatus, which may be realized as an ASIC or a general-purpose computing device; or using a combination of software, hardware, firmware, or fixed logic circuitry; with some combination thereof; and so forth. A module may be implemented as a standalone component of a device 102 or 104 as illustrated in FIG. 1. Additionally or alternatively, a module may be configured as a component of another application, as a component of an operating system (OS) of a device on which it is executing (e.g., an OS of the end-user device 102 or a local or distributed OS of the server device 104), as a plug-in or extension module, as a standalone service or as a service integrated with other services, as another device application or functionality, as a library available to another program, as an application programming interface (API) available to another program, or a combination thereof, and so forth.

As shown, the end user 108 is associated with the end-user device 102, and the service provider 110 is associated with the server device 104. The end-user device 102 can be in communication with the server device 104, or vice versa, via the at least one network 106. The network 106 is formed from at least a portion of one or more network types. Examples of network types include a public network, a private network, the Internet, the Web, an Ethernet, an intranet, an extranet, a local area network (LAN), a wide area network (WAN), a wireless network, a wired network, a cellular network, an infrastructure network, an ad hoc network, a Bluetooth network, a Wi-Fi network, a Long-Term Evolution (LTE) network, a public-switched telephone network (PSTN), or some combination thereof.

In an example scenario, the end user 108 is occasionally in motion and thus moving the end-user device 102. The end-user device 102 may be implemented as or may be configured as any suitable type of computing device. An end-user device 102 may range from a relatively high-resource device with substantial memory and processor resources (e.g., a personal computer or a game console) to a relatively low-resource device with constrained memory or processing resources (e.g., a mobile device such as a wearable). However, the end-user device 102 is typically a relatively mobile computing device, such as a laptop computer, a tablet, a mobile phone, a phablet, a portable information or entertainment appliance like as a virtual reality device, a hand-held game, a wearable computing device such as a smart watch or intelligent glasses, or some combination thereof.

The service provider 110 is associated with the server device 104. Generally, the service provider 110 is a company or other entity that provides marketing services to another company by facilitating the acquisition or analysis of data reflecting consumer behaviors or activities. The server device 104 is configured to provide the POI database 116 via the network 106. Examples of a server device 104 include a web server, a server running open source software, a server of a proprietary design, a stand-alone server, a server blade, an allocated portion of a server farm, server functionality distributed across at least one data center, or some combination thereof. Although a single server device 104 is explicitly shown in FIG. 1, a server device 104 may be representative of a plurality of different devices or distributed computing resources that interoperate or coordinate to perform operations as a "web service," "over the cloud," or "in the cloud" as is known.

Systems and Techniques

This section describes some example details of systems and techniques for facilitating a location-aware analysis in accordance with one or more embodiments.

Figure 2:
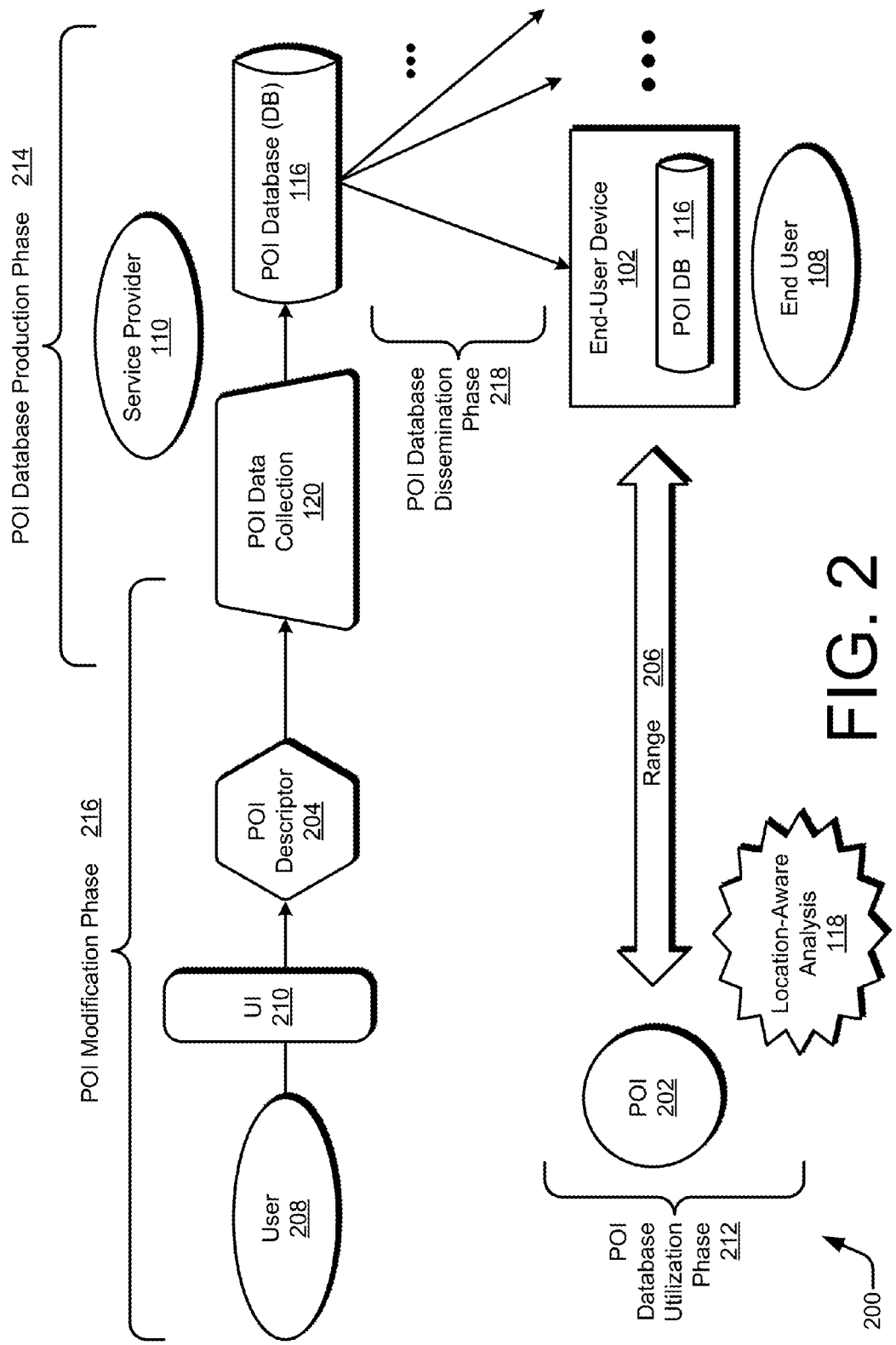
FIG. 2 illustrates an example scheme for facilitating location-aware analysis at an end-user device with respect to a point of interest (POI).

FIG. 2 illustrates an example scheme 200 for facilitating location-aware analysis at an end-user device 102 with respect to a point of interest (POI) 202. The scheme 200 includes four phases: a POI modification phase 216, a POI database production phase 214, a POI database dissemination phase 218, and a POI database utilization phase 212. For the POI modification phase 216, a user 208 employs a user interface (UI) 210 to modify at least one POI descriptor 204. Modifications can include changing an existing POI descriptor 204 or adding a new POI descriptor 204. Example implementations for the POI descriptor 204 are described below with reference to FIG. 3.

In the illustrated scenario for the scheme 200, the user 208 can be a company that wishes to gather marketing data about the end user 108 with respect to multiple POIs 202. For example, a coffee chain may wish to track how often a person is within one mile of one of its coffee store locations. As another example, a gas station company may wish to determine how often a person passes one of its locations and subsequently spends some minimum amount of time at a competitor's gas station facility within 30 minutes of passing one of its locations. The UI 210 may be realized as a web interface that is established by the service provider 110. The POI descriptors 204 are amalgamated into the POI data collection 120.

For the POI database production phase 214, the service provider 110 accumulates modifications to POI descriptors 204 as the POI data collection 120 at the server device 104 (of FIG. 1). The service provider 110 produces the POI database 116 based on the POI data collection 120 using the POI database production module 114 (of FIG. 1) that is executing on the server device 104. For the POI database dissemination phase 218, the service provider 110 launches remote updates to the POI databases 116 stored at multiple end-user devices 102. After receiving the POI database 116, the end-user device 102 newly installs the POI database 116 or replaces a previous version with the updated POI database 116.

For the POI database utilization phase 212, the end-user device 102 uses the POI database 116 to ascertain a number of potentially-relevant POIs 202. Based on the spatial organization of the POI database 116, the ascertained POIs 202 have some degree of proximity to the end-user device 102. The proximity can be further refined by calculating a range 206 between each ascertained POI 202 and the end-user device 102 using, for example, the haversine formula. Based on the ascertained POIs 202 or the calculated ranges 206, a location-aware analysis 118 can be performed by the end-user device 102. The POI proximity data or the actual results of the location-aware analysis 118 are uploaded to the service provider 110.

Figure 3:
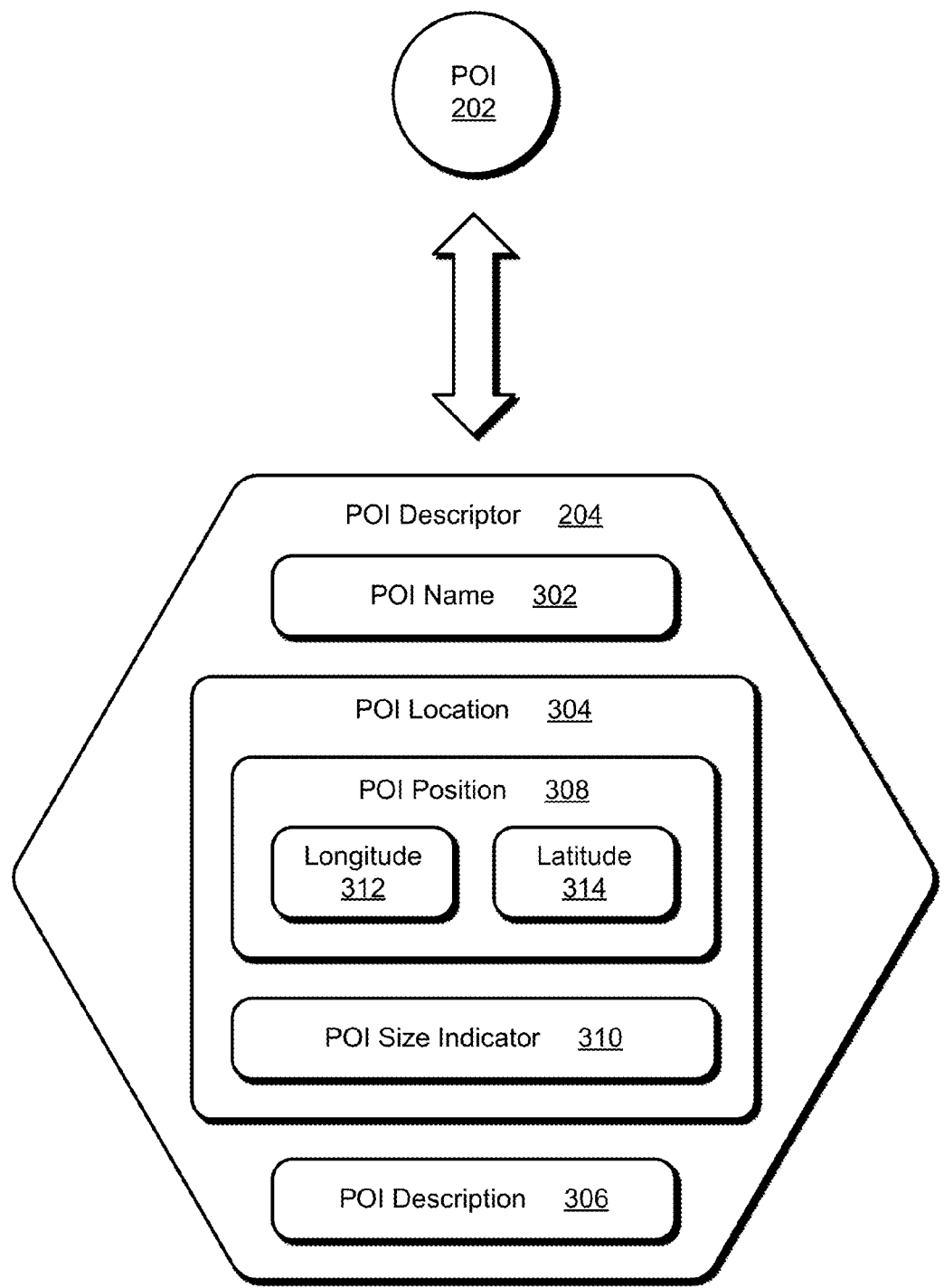
FIG. 3 illustrates an example POI descriptor including a POI location.

FIG. 3 illustrates an example POI descriptor 204 including a POI location 304. As illustrated, the POI descriptor 204 includes a POI name 302 and a POI description 306 in addition to the POI location 304. The POI name 302 can be a human-understandable name, an alphanumeric identifier, a code, a globally-unique identification, or some combination thereof. The POI description 306 can include features of the POI, an associated category for the POI, or a combination thereof that explains what is available or present at the POI 202. The POI description 306 can be provided by the service provider 110 or the user 208 (of FIG. 2) and can be used for filtering POIs, ranking POIs, providing additional information to the end user 108, and so forth.

In example implementations, the POI location 304 provides a point or a boundary description to identify where in some space a corresponding POI 202 is located. The POI location 304 includes a POI position 308 and a POI size indicator 310. The POI position 308 is designated with one or more coordinates. For example, the POI position 308 can include two values: a longitude 312 and a latitude 314. The POI size indicator 310 specifies a size relative to the POI position 308. For example, the POI size indicator 310 may comprise a radius from the central position, a combination of a length and width from a corner position, and so forth. Alternatively, the POI size indicator 310 may comprise another position, such as a diagonal corner to specify a rectangular shape.

An example metadata format for a POI descriptor 204 is set forth below:

```
{
  "p" : [ // definition of POI and its associated radius (order matters)
     "adobe sj",     // [0] (string) friendly name of POI
     37.330663,      // [1] (float) latitude of the center of the POI
     −121.894040,    // [2] (float) longitude of the center of the POI
     500             // [3] (float) radius in meters of the POI
  ],
  // definition of geofence triggers to register (order does not matter)
  // presence of "e" means this POI should be monitored for Entry events
  // presence of "x" means this POI should be monitored for Exit events
  // presence of "d(n)" means this POI should be monitored for dwell
  events, with (n) being replaced with an overall dwell time in seconds
  "f" : "exd600",
  "x" : { // extended meta data (reserved for future 3rd party integrations)
     "key" : "value",
     ...
  }
}
```

Thus, an example POI descriptor 204 that is formulated in accordance with the example metatdata format above can read: "{"p":["adobe sj",37.330663,−121.894040,500], "f": "exd600","x":{"customkey":"customvalue"}}\t{/*additional POI definition*/}".

However, POI descriptors 204 can be formatted in alternative manners.

Figure 4:
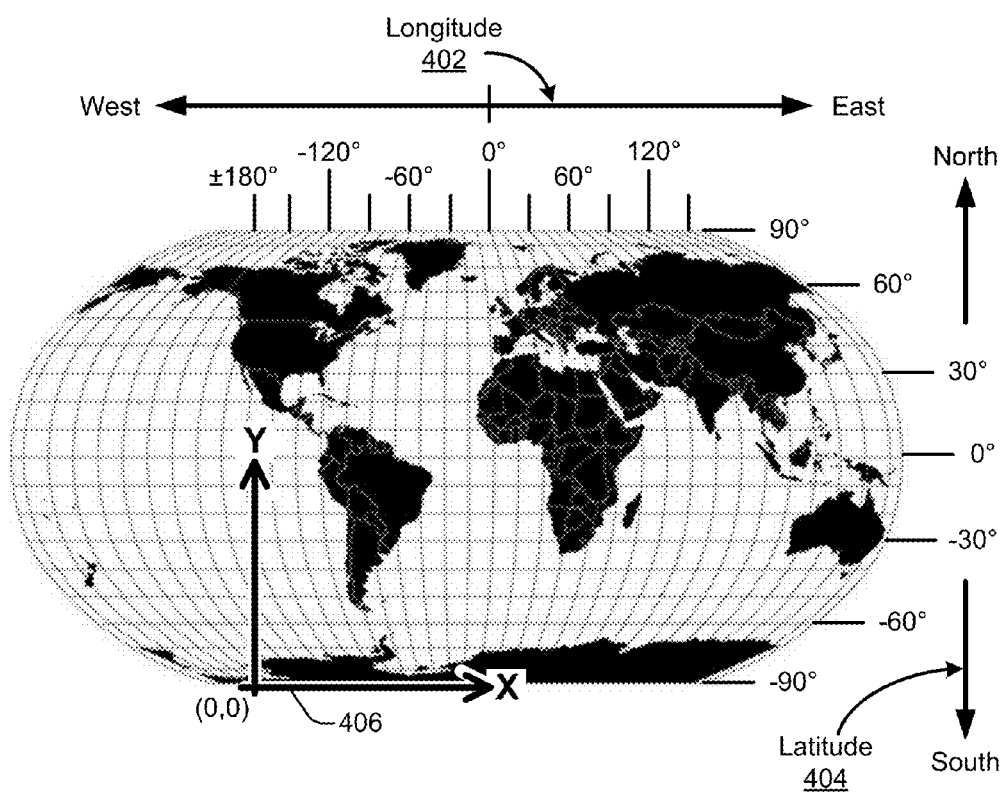
FIG. 4 illustrates an example coordinate-based approach for specifying a POI location or segmenting an area over which multiple POIs are situated.

FIG. 4 illustrates an example coordinate-based approach 400 for specifying a POI location or segmenting an area over which multiple POIs are situated. A projection of the globe onto two dimensions is shown in FIG. 4. In conjunction with the projection, a longitude axis 402 and a latitude axis 404 are depicted. The longitude axis 402 runs horizontally from the prime meridian −180° west and +180° east. The latitude axis 404 runs vertically from the equator +90° north and −90° south.

For implementations in which POIs and end users are situated in physical space on the round earth, longitude and latitude exist in "curved" space. To simplify database searching, an approximation is adopted so that the POI database works with "square" space. The "square" space approximation also facilitates use of a quadtree algorithm for spatially-organizing POIs in a tree data structure. Accordingly, coordinate axes 406 are depicted in FIG. 4 with a (0,0) origin, an "x" abscissa axis, and a "y" ordinate axis. The x-axis corresponds to values along the longitude axis 402, and the y-axis corresponds to values along the latitude axis 404. However, to simplify calculations and the database searching, the values are converted to a positive range, as is described with reference to FIG. 5.

Figure 5:
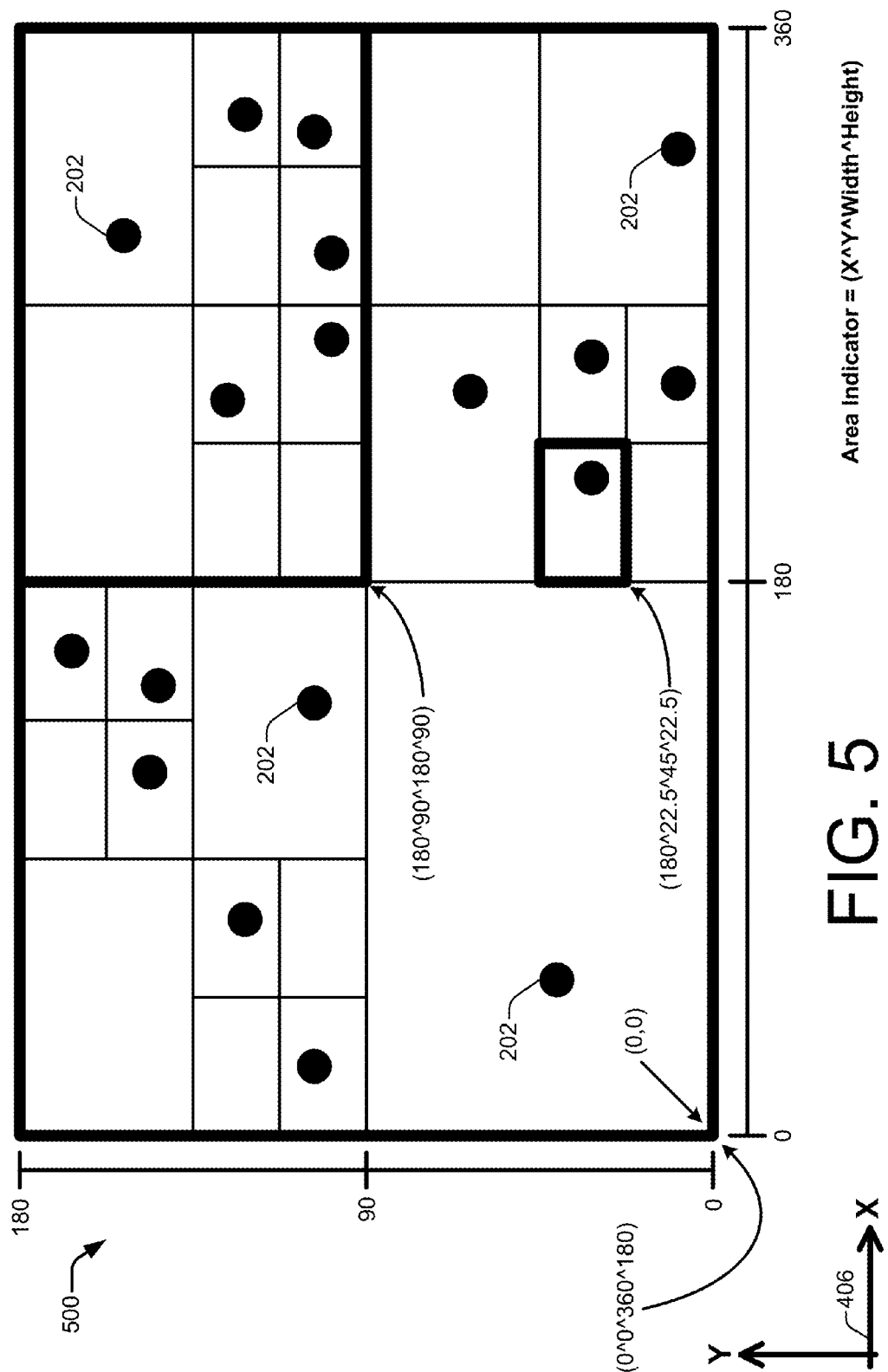
FIG. 5 illustrates an example approach for segmenting a space having multiple POIs into increasingly smaller areas.

FIG. 5 illustrates an example approach 500 for segmenting a space having multiple POIs 202 into increasingly smaller areas. In example embodiments, a rectangular space is segmented into increasingly smaller quadrants in accordance with the quadtree algorithm. The coordinate axes 406 are shown, and the lower left corner of the space corresponds to the (0,0) origin coordinate point as indicated. The horizontal direction of the space extends from 0 to 360 to accommodate the longitude axis 402 of FIG. 4. The vertical direction of the space extends from 0 to 180 to accommodate the latitude axis 404. The longitude and latitude values are scaled into the positive range to simplify the location matching determination and thereby reduce the processing demands for searching the POI database at the end-user devices.

The POIs 202 are represented by large dots in FIG. 5. The POIs 202 are added to particular areas based on respective locations at which the POIs are situated in space. Each area has a threshold maximum number of POIs, such as 10, 550, or 1000. For the sake of visual clarity, the threshold number of POIs per area is one in the example of FIG. 5. Thus, each time a second POI is added to an area, the area is segmented into four equal-sized sub-quadrants, and the POIs are redistributed into the new quadrants. As is apparent from the approach 500 as depicted in FIG. 5, each area therefore includes zero or one POI 202, and no set of four sub-quadrants that are segmented from the same parent quadrant includes fewer than two POIs 202.

The areas respectively correspond to, and can be represented by, an area indicator. In some implementations, the area indicator for a rectangular area is formulated in accordance with the following format: "(x-coordinate of a point^y-coordinate of the point^width^height)." The values for the area indicators corresponding to three different areas are specifically indicated in accordance with this format. Each of the three areas is bounded by a thick rectangle, and the corresponding area indicator matches the lower left coordinate point of the rectangle. One example area encompasses the entire space and corresponds to the area indicator (0^0^360^180). A second example area encompasses the upper right quadrant of the entire space and corresponds to the area indicator (180^90^180^90). A third example area is located in the lower right quadrant and corresponds to the area indicator (180^22.5^45^22.5). However, other formats for area indicators may be implemented or may correspond to other coordinate points of a corresponding area. For example, an area indicator for a rectangular area may be formatted in accordance with the following: "(x-coordinate of point #1^y-coordinate of point #1^x-coordinate of point #2^y-coordinate of point #2)," with point #1 and point #2 being opposite diagonal corners of the rectangular area. Also, areas with alternative shapes, such as a hexagon or a triangle, may be implemented.

Figure 6:
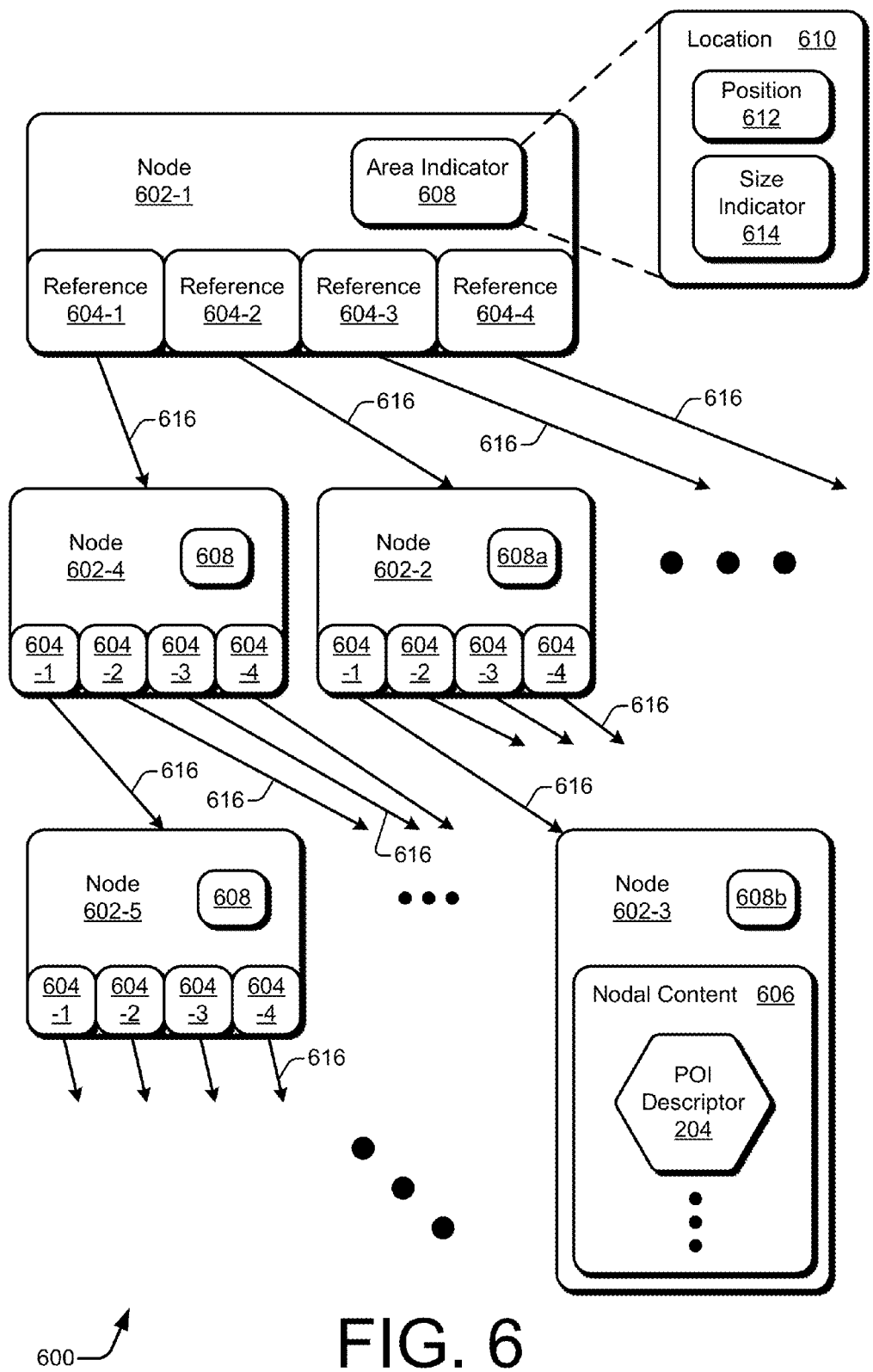
FIG. 6 depicts an example POI tree data structure including nodes having references that serve as pointers or nodal content that includes POI descriptors.

FIG. 6 depicts a portion of an example POI tree data structure 600 including multiple nodes 602 that are interconnected by pointers 616. Five nodes 602-1, 602-2, 602-3, 602-4, and 602-5 are illustrated. Each node 602 corresponds to a spatial area and includes an area indicator 608 for the corresponding area. Each node 602 also includes nodal content 606 or multiple references 604. The POI tree data structure 600 is representative of a tree data structure constructed in accordance with the quadtree algorithm. Consequently, each reference node 602 (e.g., nodes 602-1, 602-2, 602-4, and 602-5) that includes at least one reference 604 includes four references 604-1, 604-2, 604-3, and 604-4. Each reference 604 serves as a pointer 616 to one of four child nodes or subnodes.

The node 602-1 illustrated at the top of the POI tree data structure 600 is the root node 602-1. Other nodes 602 spawn from the root node 602-1. The limbs of the POI tree data structure 600 branch out four ways at each node 602 until a leaf node 602 (e.g., node 602-3) is reached. Each leaf node 602 is a content node 602 having nodal content 606. Nodal content 606 that is not empty includes one or more POI descriptors 204, up to the threshold maximum number of POIs in any given area.

The area indicator 608 can be implemented as a human-understandable name, an alphanumeric value, a code, a randomly-assigned value, or some combination thereof. However, in an example implementation, the area indicator 608 includes a location 610. The location 610 provides a boundary description to describe where in some space the corresponding area is located as well as the borders thereof. The location 610 includes a position 612 and a size indicator 614. The position 612 is designated with one or more coordinates, such as geospatial coordinates. For example, the position 612 can include two values: a longitude coordinate and a latitude coordinate of a corner or center of an area. The size indicator 614 specifies a size relative to the position 612. For example, the size indicator 614 may comprise a combination of a length and width from a corner position, positive and negative ranges in the longitude and latitude direction from a central position, another position—such as a diagonal corner to specify a rectangular shape, and so forth. An example format for an area indicator for a rectangular area is described above with reference to FIG. 5.

Figure 7:
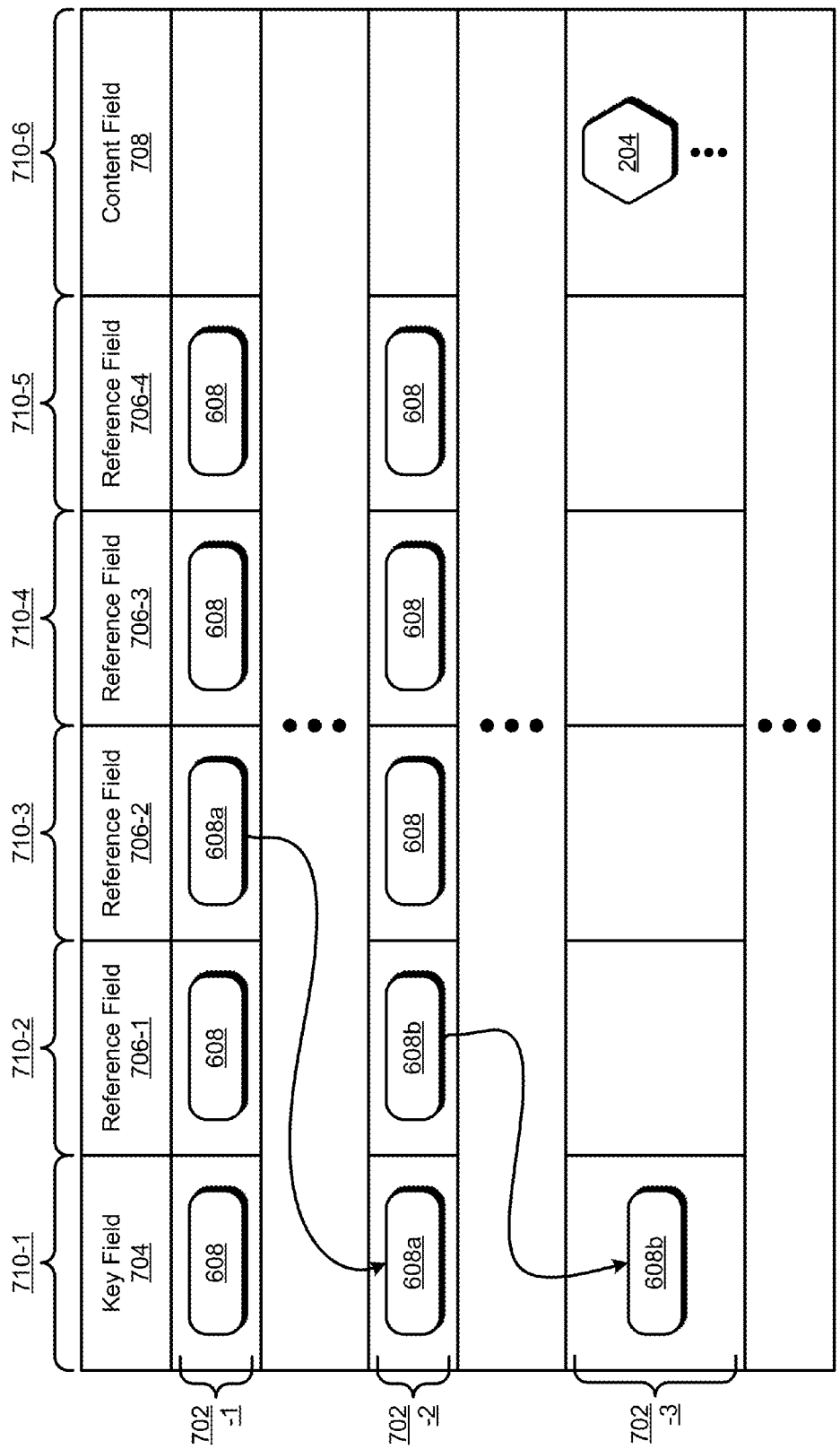
FIG. 7 depicts an example POI database including entries with populated reference fields or a populated content field.

FIG. 7 depicts an example POI database 116 including entries 702 with populated reference fields 706 or a populated content field 708. The POI database 116 is an example of a POI database resulting from a conversion of a POI tree data structure 600. The POI database 116 includes multiple entries 702, including entries 702-1, 702-2, and 702-3. The POI database 116 also includes multiple columns 710, including columns 710-1 to 710-6. Each column 710 corresponds to a particular field of a given entry 702. The column 710-1 corresponds to a key field 704. The four columns 710-2, 710-3, 710-4, and 710-5 correspond respectively to four reference fields 706-1, 706-2, 706-3, and 706-4. The column 710-6 corresponds to a content field 708. Reference entries 702 include values in the reference fields 706, and content entries include POI descriptors 204 in the content field 708.

In example embodiments, the POI database 116 comprises a relational database, and each entry 702 comprises a tuple or a record of the database. Each entry 702 also comprises a row of the POI database 116 and is derived from a node 602 of a POI tree data structure 600. With reference also to FIG. 6, the root entry 702-1 is derived from the root node 602-1, the reference entry 702-2 is derived from the reference node 602-2, and the content entry 702-3 is derived from the content node 602-3. For certain example implementations described herein, a node 602 includes either references or content, and an entry 702 includes either populated reference fields 706 or a populated content field 708. However, POI tree data structures 600 or POI databases 116 can be implemented in alternative manners.

To build the POI database 116, an entry 702 is inserted for each node 602 of the POI tree data structure 600. The POI database 116 is searchable using a primary key, which is included in the key field 704. The key field 704 is populated with the area indicator 608 of the corresponding node 602. Thus, the area indicator 608 of the root entry 702-1 represents the entire space. Each reference field 706 of an entry 702 corresponding to a given node 602 is populated with the area indicator 608 corresponding to a subnode to which the corresponding reference 604 of the given node 602 points. The content field 708 of an entry 702 is populated with multiple POI descriptors 204 of the corresponding node 602.

With reference to both FIG. 6 and FIG. 7, the reference 604-2 of the root node 602-1 points to the node 602-2, which includes the area indicator 608a. Thus, the reference field 706-2 of the root entry 702-1 is populated with the area indicator 608a. Further, the key field 704 of the reference entry 702-2 is also populated with the area indicator 608a. The reference 604-1 of the reference node 602-2 points to the content node 602-3, which includes the area indicator 608b. Thus, the reference field 706-1 of the reference entry 702-2 is populated with the area indicator 608b. Further, the key field 704 of the content entry 702-3 is also populated with the area indicator 608b. The content field 708 of the content entry 702-3 is populated with the POI descriptors 204 included in the nodal content 606 of the content node 602-3.

In this manner, the linkages between nodes 602 of the POI tree data structure 600 are effectively reproduced by the self-referencing relationship between the reference fields 706 and various corresponding key fields 704 using the primary key searchability of the POI database 116. These linkages can be traced as the areas become increasingly smaller until an area is discovered having no more than the maximum threshold number of potentially-relevant POIs 202. Utilization of the POI database 116 by traversing the implicit linkages between entries 702 is described further below with reference to FIGS. 11 and 14.

Figure 8:
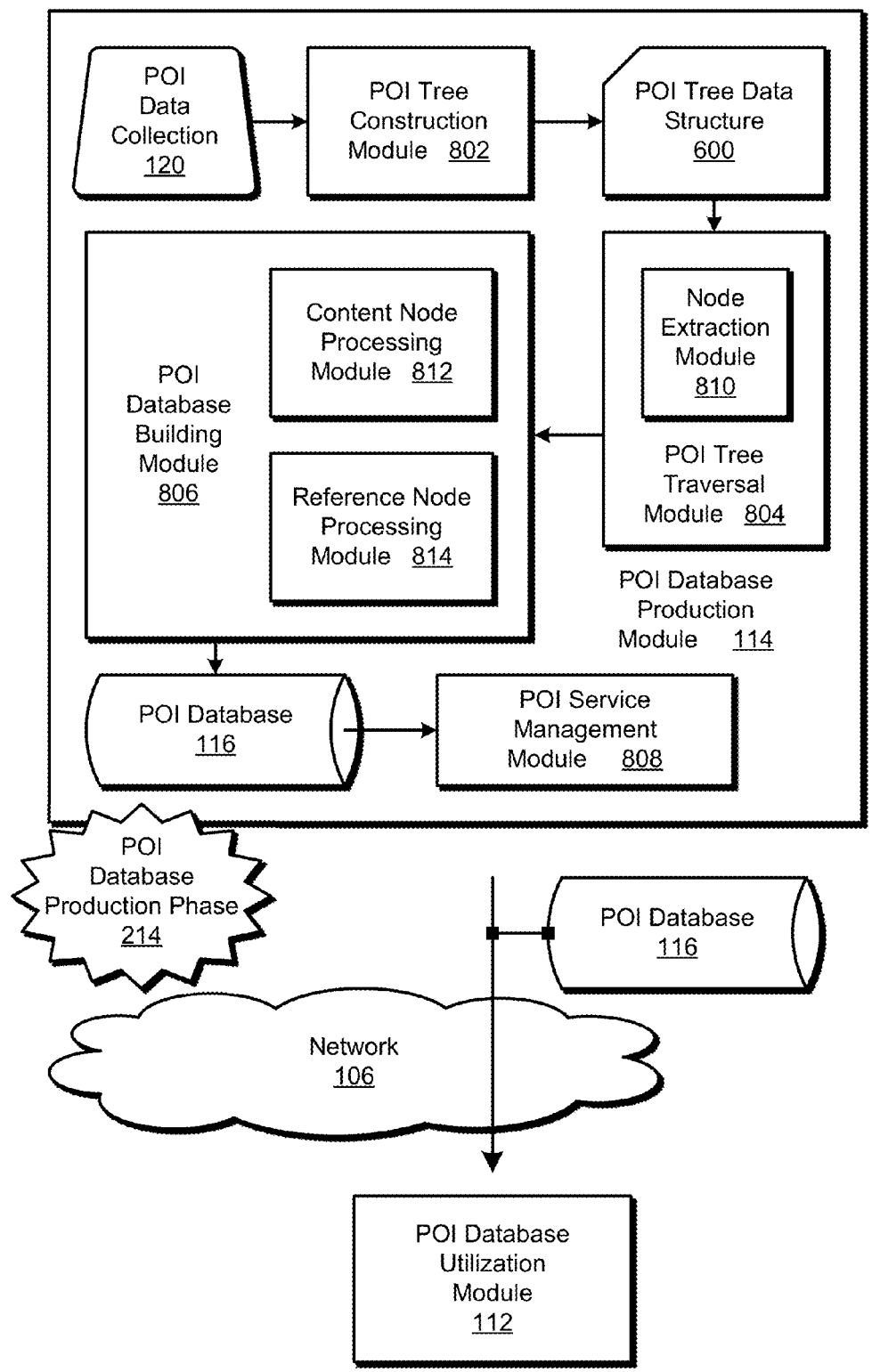
FIG. 8 illustrates an environment including an example POI database production module for a server device.
Figure 10:
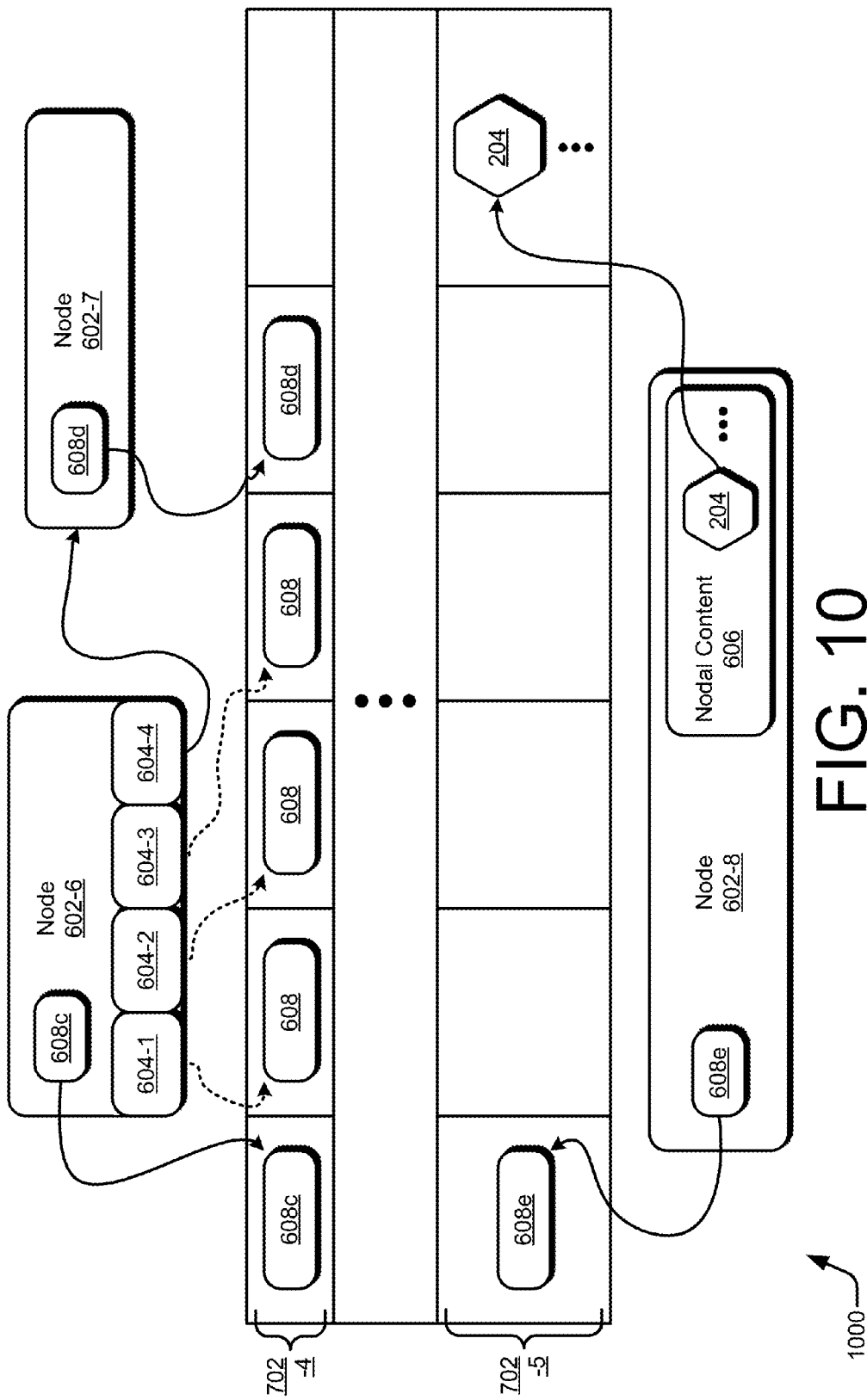
FIG. 10 is a schematic diagram illustrating an example approach to building a POI database by inserting entries based on nodes of a POI tree data structure.

FIG. 8 illustrates an environment 800 including an example POI database production module 114 for a server device 104 (of FIG. 1). In some embodiments, the POI database production module 114 constructs a POI tree data structure 600, builds a POI database 116, and disseminates the POI database 116 to a POI database utilization module 112 at multiple end-user devices 102. As illustrated, the POI database production module 114 includes a POI tree construction module 802, a POI tree traversal module 804, a POI database building module 806, and a POI service management module 808. The POI tree traversal module 804 includes a node extraction module 810, and the POI database building module 806 includes a content node processing module 812 and a reference node processing module 814. The POI database production module 114 has access to the POI data collection 120. An example operation of the POI database production module 114 is described below with reference also to FIGS. 6 and 10. FIG. 10 is a schematic diagram illustrating an example approach 1000 to building a POI database 116 by inserting entries 702 based on nodes 602 of a POI tree data structure 600.

To construct a POI tree data structure 600, a POI tree construction module 802 instantiates a root node 602-1 that corresponds to an entirety of a desired space, such as the world or the contiguous United States, or a region thereof. POI descriptors 204 are added to the root node 602-1 from a POI data collection 120 until a threshold number of POIs 202 have been added. Once the threshold number is reached, the space is segmented into four areas, and four subnodes (e.g., the nodes 602-4, 602-2 . . . ) that correspond respectively to the four areas are instantiated. The POI tree construction module 802 also adds four references 604-1 to 604-4 to the root node 602-1 with the references respectively pointing to the four subnodes to thereby make the root node 602-1 a reference node. Based on the locations of the POIs 202, the POI descriptors 204 that were previously included with the root node 602-1 are redistributed into one of the four subnodes that correspond to the four areas. The POI tree construction module 802 continues to incorporate more POI descriptors 204 from the POI data collection 120 into the POI tree data structure 600. Each time a given node 602 corresponding to a given area reaches the threshold number of POIs 202, four subnodes are added to the POI tree data structure 602. The POIs 202 in the given node are redistributed to the four subnodes, which correspond to four subareas of the given area, by including the POI descriptors 204 in the appropriate subnode 602 based on location. Upon completion of the POI tree data structure 600, each leaf node is a content node without references 604 that may include at least one POI descriptor 204.

To enable the spatial organization of the POI tree data structure 600 to be utilized by resource-constrained mobile devices, the POI tree data structure 600 is converted to a POI database 116 that occupies less memory and that can be persisted to storage memory, such as disk or flash memory. Furthermore, in contrast with the POI tree data structure 600, the persistent POI database 116 can be transmitted to end-user devices via one or more networks.

A POI tree traversal module 804 obtains the POI tree data structure 600 and traverses the linkages between nodes. The POI database building module 806 converts the nodal information, including references to other nodes—if any, into the POI database 116. The node extraction module 810 starts by extracting the root node 602-1. The POI database building module 806 converts the root node 602-1 to the root entry 702-1 of the POI database 116. The node extraction module 810 continues by extracting other nodes 602. To insert an entry 702 in the database, the POI database building module 806 populates a key field 704 of the entry 702 with the area indicator 608 of the extracted node 602 being converted to the database entry 702. For example, with reference to FIG. 10, the area indicator 608c of the reference node 602-6 is included in the key field 704 of the reference entry 702-4. Also, the area indicator 608e of the content node 602-8 is included in the key field 704 of the content entry 702-5.

With continuing reference to FIG. 10, if an extracted node 602 of a POI tree data structure 600 is the content node 602-8, the content node processing module 812 populates a content field 708 of the database entry 702-5 with the POI descriptors 204 of the content node 602-8. On the other hand, if an extracted node 602 is a reference node 602-6, the reference node processing module 814 populates four reference fields 706-1 to 706-4 of the database entry 702-4 based on the references 604-1 to 604-4 of the reference node 602-6. As indicated by the dashed arrows between the reference node 602-6 and the reference entry 702-4, a respective area indicator 608 corresponding to each subnode pointed to by a respective reference 604 of the reference node 602-6 is placed in a respective reference field 704 of the reference entry 702-4. This indirect mechanism to populate reference fields 704 is shown more clearly with the solid arrow. The reference 604-4 of the reference node 602-6 points to a node 602-7. The node 602-7 includes an area indicator 608d. Thus, the reference node processing module 814 populates the reference field 706-4 of the reference entry 702-4 with the area indicator 608d.

The node processing to convert each node 602 to a database entry 702 proceeds recursively down the limbs of the POI tree data structure 600 and across the overall tree data structure until the POI database 116 is built. In this manner, the POI tree data structure 600 can be persisted as a POI database 116. Moreover, the location-based organization of the nodes 602 in the POI tree data structure 600, which encodes a relative spatial grouping of the POIs 202, is preserved by converting the inter-nodal pointers of the references 604 of the tree data structure into values populating reference fields 706 of the database entries 702 that self-reference other entries 702 of the POI database 116 using the key fields 704 thereof. The POI service management module 808 disseminates the POI database 116 to a POI service interaction module 902 (of FIG. 9) at each POI database utilization module 112 at multiple end-user devices 102.

Figure 9:
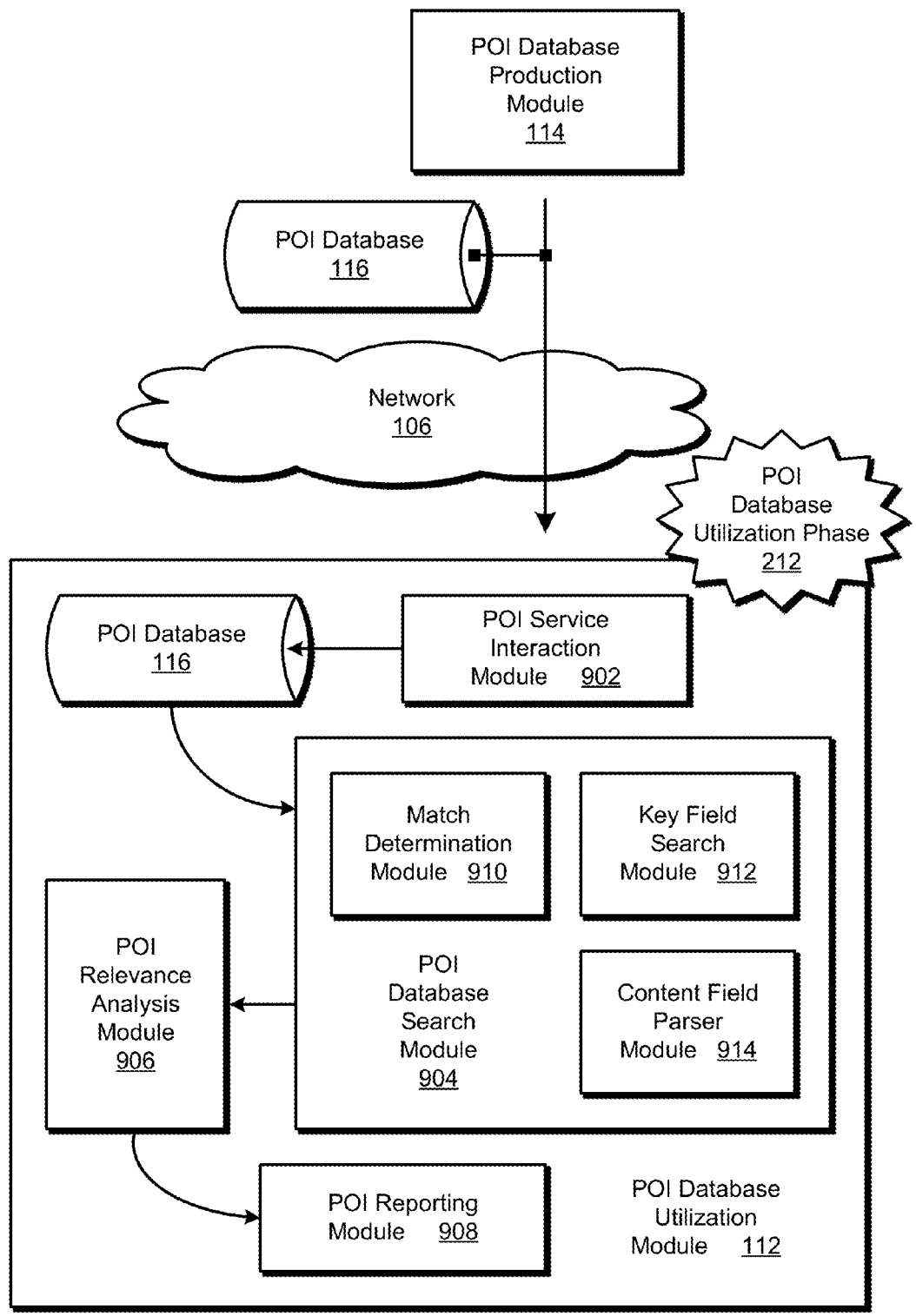
FIG. 9 illustrates an environment including an example POI database utilization module for an end-user device.
Figure 11:
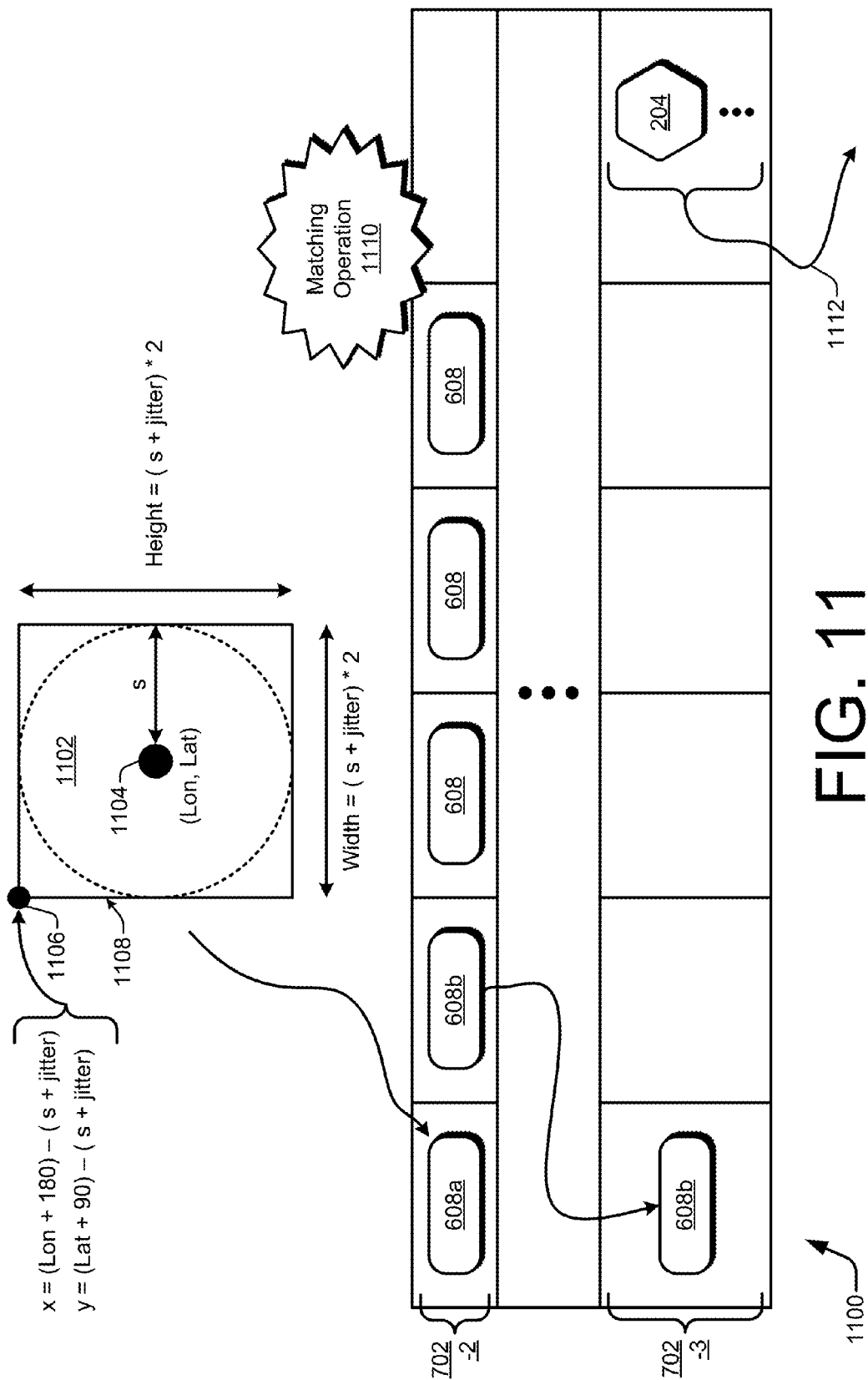
FIG. 11 is a schematic diagram illustrating an example approach to utilizing a POI database by searching entries based on a location of an end-user device.

FIG. 9 illustrates an environment 900 including an example POI database utilization module 112 for an end-user device 102 (of FIG. 1). In some embodiments, the POI database utilization module 112 receives the POI database 116 and uses the POI database 116 to ascertain multiple potentially-relevant POIs 202 based on a location of an end-user device 102. As illustrated, the POI database utilization module 112 includes a POI service interaction module 902, a POI database search module 904, a POI relevance analysis module 906, and a POI reporting module 908. The POI database search module 904 include a match determination module 910, a key field search module 912, and a content field parser module 914. The POI database utilization module 112 can obtain a current location of the end-user device 102 using local technology, such as a GPS chip, or by receiving the location from a remote source, such as a wireless network. An example operation of the POI database utilization module 112 is described below with reference also to FIGS. 7 and 11. FIG. 11 is a schematic diagram illustrating an example approach 1100 to utilizing a POI database 116 by searching entries 702 based on a location 1102 of an end-user device 102.

At the end-user device 102, the POI service interaction module 902 receives an application update that includes a new POI database 116 from the POI service management module 808 (of FIG. 8) of the POI database production module 114. The POI database 116 can then be searched to ascertain POIs 202 that are proximate to a current location of the end-user device 102. In operation, the POI database search module 904 obtains a location 1102 of the end-user device. The location 1102 of the end-user device may be established using a bounding box 1108 to account for expansive sizes of POIs 202 or for a size of a range that can be traveled by the end user 108 with the end-user device within some time period. An example bounding box implementation is described further below with reference to FIG. 11. The match determination module 910 initially queries the POI database 116 for the root entry 702-1 corresponding to the root node 602-1 of the POI tree data structure 600. The match determination module 910 compares the location 1102 of the end-user device to the respective area indicator 608 populating each of the four reference fields 706-1 to 706-4 of the root entry 702-1 to look for at least one match, with each area indicator 608 representing a respective boundary of a subarea. A match is determined if the location 1102 of the end-user device intersects the boundary defined by an area indicator 608, such as by being at least partially present within the boundary.

With reference to both FIGS. 7 and 11, the key field search module 912 searches the key fields 704 of the entries 702 of the POI database 116 using the matching area indicator, such as the area indicator 608a of the reference field 706-2 of the root entry 702-1, as the primary key search term. For example, the key field search module 912 queries the POI database 116 to retrieve the entry 702 having the matching are indicator 608a in the key field 704 thereof. This new entry, such as the entry 702-2, is returned from the database and covers one-fourth of the area of the root entry 702-1. The new entry 702-2 is analyzed to determine if the entry includes values in reference fields 706 or values in a content field 708. If the new entry 702-2 is a reference entry, the match determination module 910 operates to determine a new reference field 706, such as reference field 706-1, having a new area indicator 608, such as area indicator 608b, that matches the location 1102 of the end-user device. The new area indicator 608b is then used by the key field search module 912 to find an entry 702 having a key field 704 matching the area indicator 608b. The querying of the POI database 116 and the following of the self-referential reference fields 706 to perform matching operations 1110 continue until a content entry having items in a content field 708 is reached, such as the content entry 702-3 that corresponds to a content node 602-3 at a branch-terminating leaf of the POI tree data structure 600.

With continuing reference to FIG. 11, the content field parser module 914 extracts POI descriptors 204 from the content field 708 of the content entry 702-3 as indicated at arrow 1112. Based on the tree-to-database conversion process used to build the POI database 116, the number of extracted POI descriptors 204 is no more than the threshold number permitted in each node 602 of the POI tree data structure 600. If the location 1102 of the end-user device matches two different reference fields 706 of any single database entry 702 during a matching operation 1110 of the searching (e.g., because of an overlapping boundary box 1108 that intersects two or more area indicators 608), another chain of database queries can be followed to ultimately extract another group of POI descriptors 204 from a content entry 702 corresponding to a different leaf node 602.

After the potentially-relevant POIs 202 are ascertained by extracting POI descriptors 204 from a content field 708 of one or more matching content entries 702, a POI relevance analysis module 906 determines a relevance of each POI 202 of each POI descriptor 204. The respective relevance of each POI 202 can be based, for example, on a distance between the end-user device 102 and the respective POI 202. The distance can be determined using, for instance, the haversine formula, which can provide a precise distance between two coordinate points in curved space. After a relevance has been ascribed to each extracted POI descriptor 204, or as part of the relevance analysis, the POIs 202 are ranked based on the relevance. For example, the 12 closest POIs 202 that meet a certain preference stipulated by the user 208 can be ranked.

A POI reporting module 908 provides a report of the ranked POIs 202, such as the 20 most relevant POIs, based on proximity or one or more other filtering parameters. The POI reporting module 908 reports the relevant POIs to another module or application executing on the end-user device 102 or to a marketing service in the cloud. Alternatively, the POI reporting module 908 can report the POIs 202 to the end-user 108. For example, the relevant POIs 202 can be presented to the end-user 108 visually in list form or as depicted on a map relative to a current location of the end-user device 102. In these manners, location-aware analysis is facilitated by providing to end-user devices 102 a persistent POI database 116 that can be searched efficiently, including while an end-user device 102 is unable to establish a wireless connection with a remote server device 104. The end-user device 102 can ascertain potentially-relevant POIs 202 from the POI database 116 by making relatively few queries because each query result significantly narrows the remaining area to be searched.

An example approach to establishing a bounding box 1108 is shown in FIG. 11. The location 1102 of the end-user device 102 can include the search coordinates, or position 1104 of the end-user device 102, along with additional data establishing the bounding box 1108. The position 1104 includes the current longitude (Lon) and latitude (Lat) coordinates of the end-user device 102. The variable s represents the maximum size of a POI 202. This enables the searching of the POI database 116 to include ascertaining an intersection with any POI 202 in which the position 1104 is currently present. The height of the bounding box 1108 is set to "(s+jitter)*2". The width of the bounding box 1108 is also set to "(s+jitter)*2" for an example square bounding box. The reference point 1106 has an x-coordinate of "(Lon+180)−(s+jitter)" and a y-coordinate of "(Lat+90)−(s+jitter)." The jitter variable accounts for the curved space of the earth in which meridian lines converge at the poles. The jitter is set to the maximum potential error amount. This error amount can be determined by taking the distance (s) and calculating the maximum decimal distance at two different bearings—e.g., at 90 and 180 degrees. This provides the largest possible decimal difference, which is used to ensure the relevant POIs are ascertained when the search in performed in "square" space.

If the bounding box 1108 is established with the size s being set to the largest size amongst the POIs 202 in the POI database 116, the resulting searches are applicable to finding POIs 202 that are already available at the current location 1102. In an alternative embodiment, the variable s instead represents the maximum size of a distance that can be reasonably traveled in some given period of time. For example, the size s can be set to 300 miles for a day trip in a vehicle, 1 mile for a short excursion on foot, 5 miles for a trip to a restaurant, and so forth. Thus, the closest POIs 202 to a current location 1102 can be ascertained by utilizing the POI database 116 with this embodiment.

Having discussed example details of systems, techniques, and schemes for facilitating location-aware analysis, consider now some example procedures to illustrate additional aspects of the techniques.

Example Procedures

Figure 12:
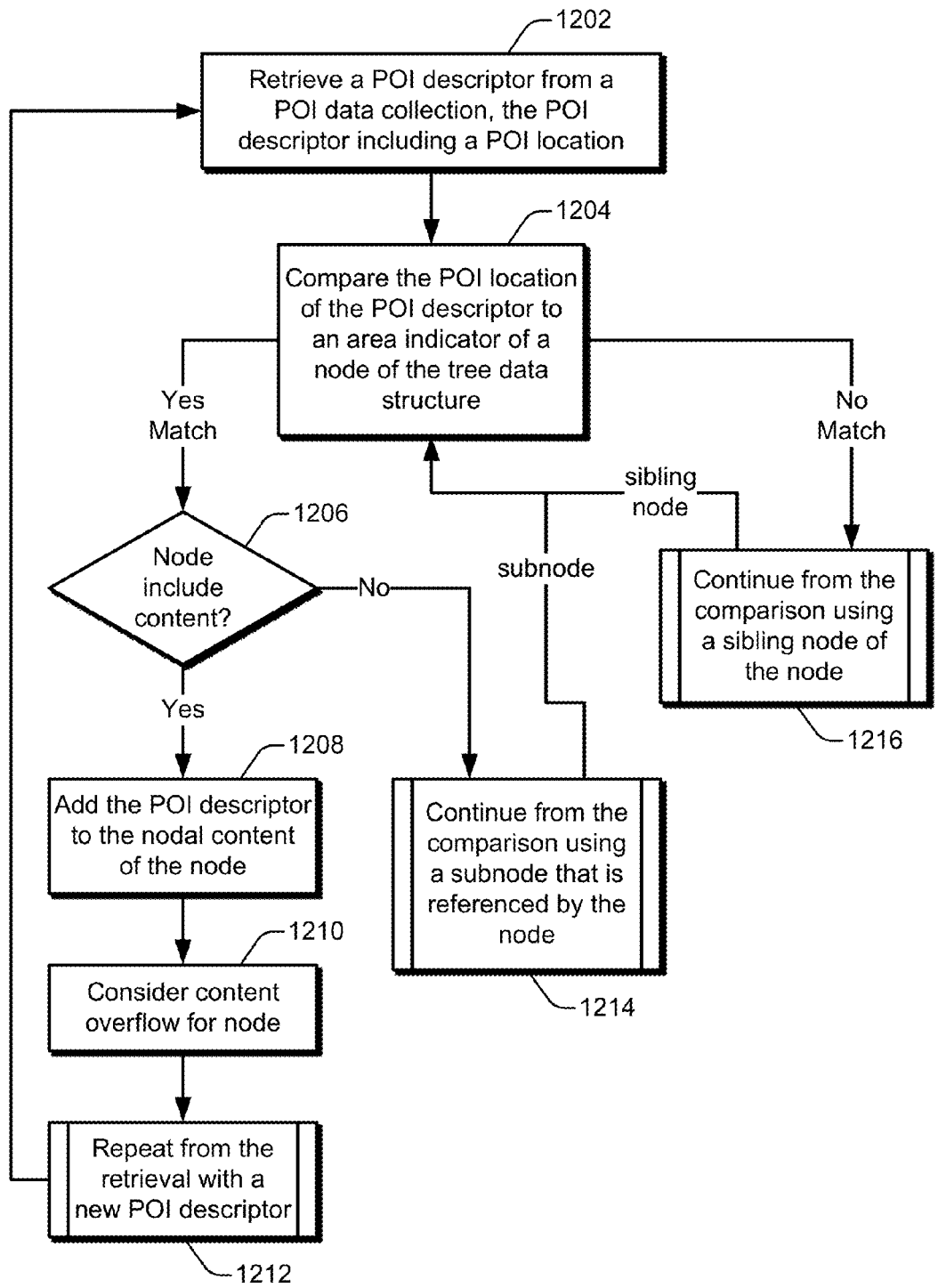
FIG. 12 is a flow chart illustrating an example procedure for constructing a POI tree data structure from a POI data collection including multiple POI descriptors.
Figure 13:
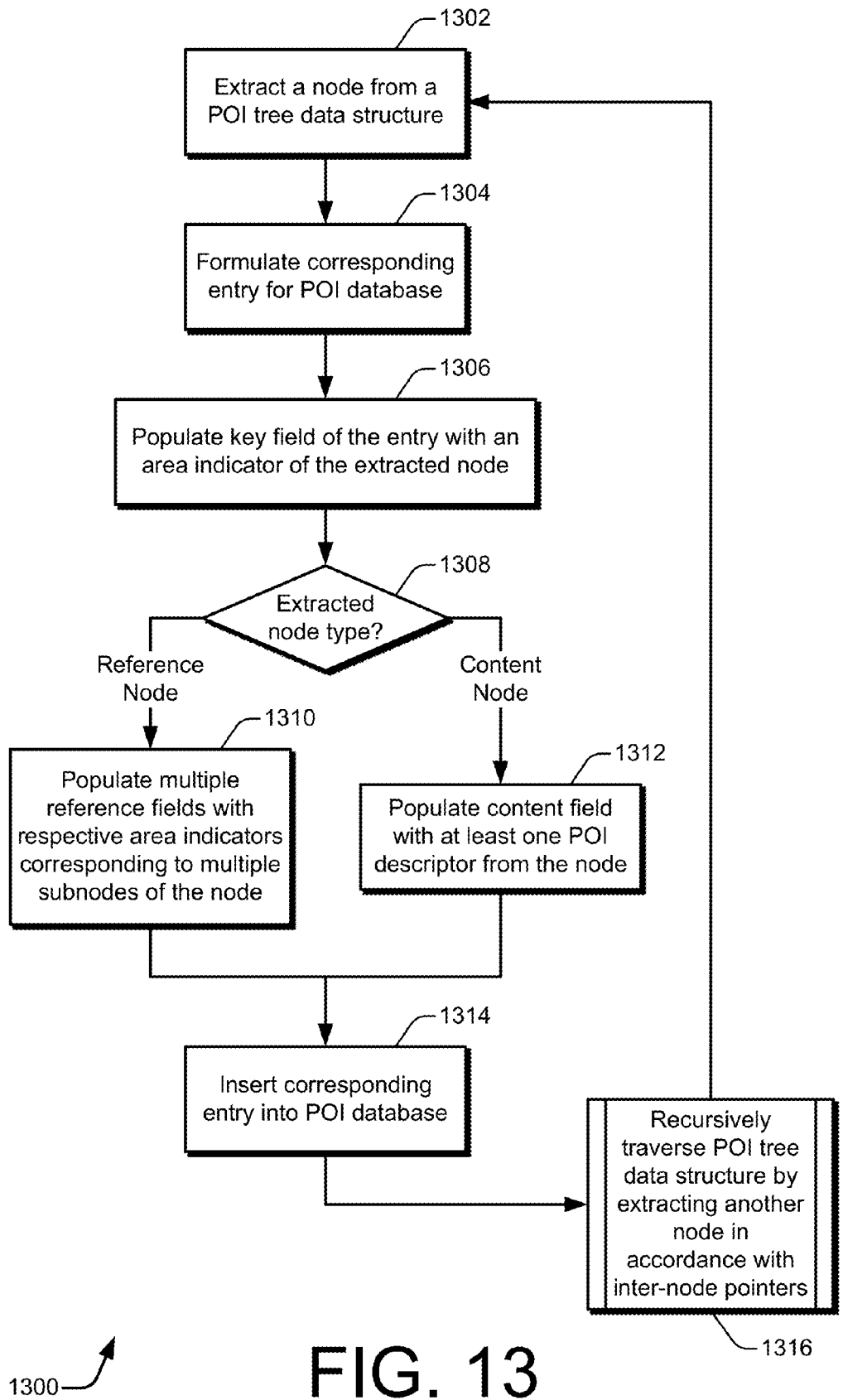
FIG. 13 is a flow chart illustrating an example procedure for building a POI database from a POI tree data structure.
Figure 14:
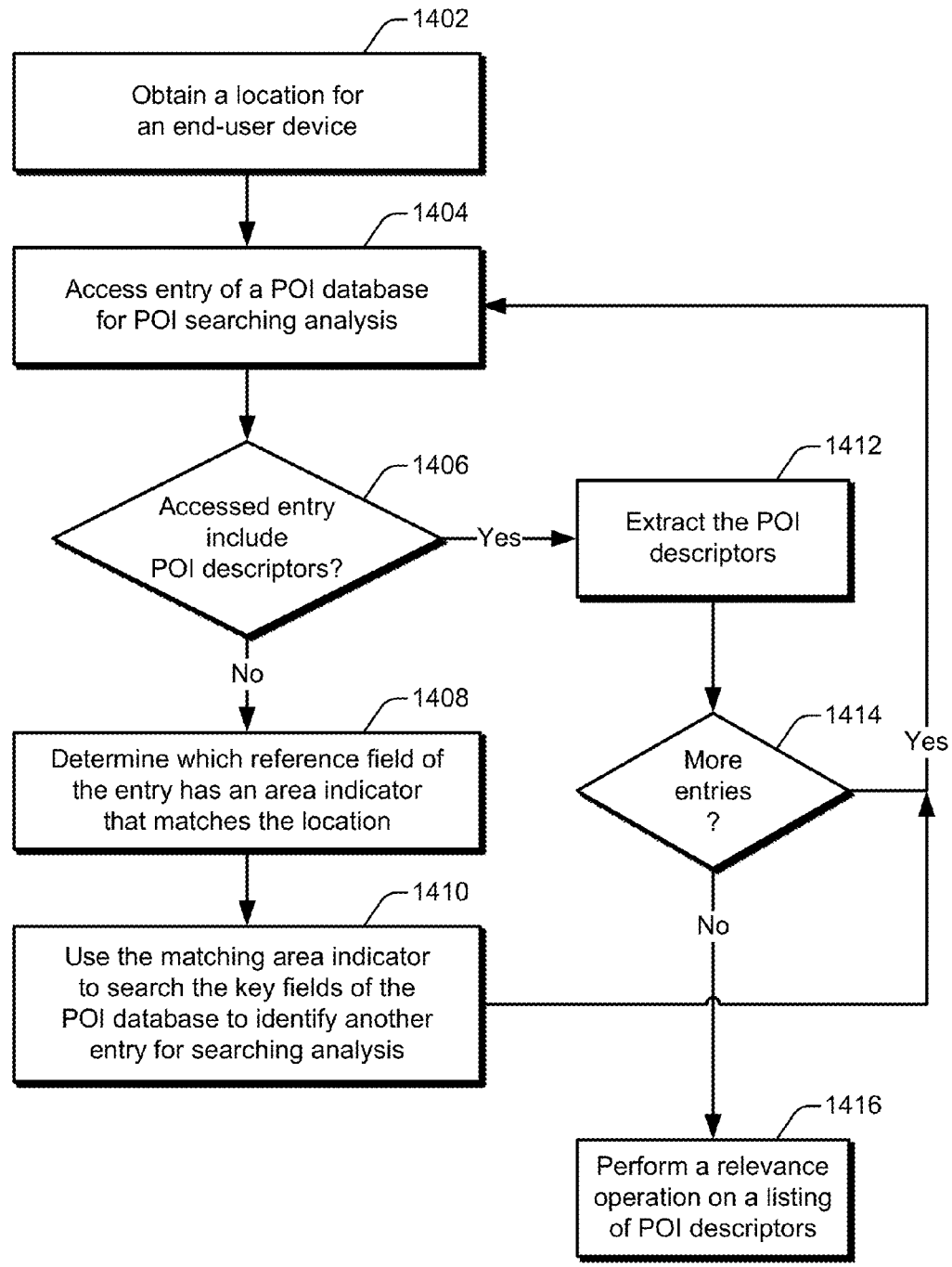
FIG. 14 is a flow chart illustrating an example procedure for utilizing a POI database as part of a location-aware analysis.
Figure 15:
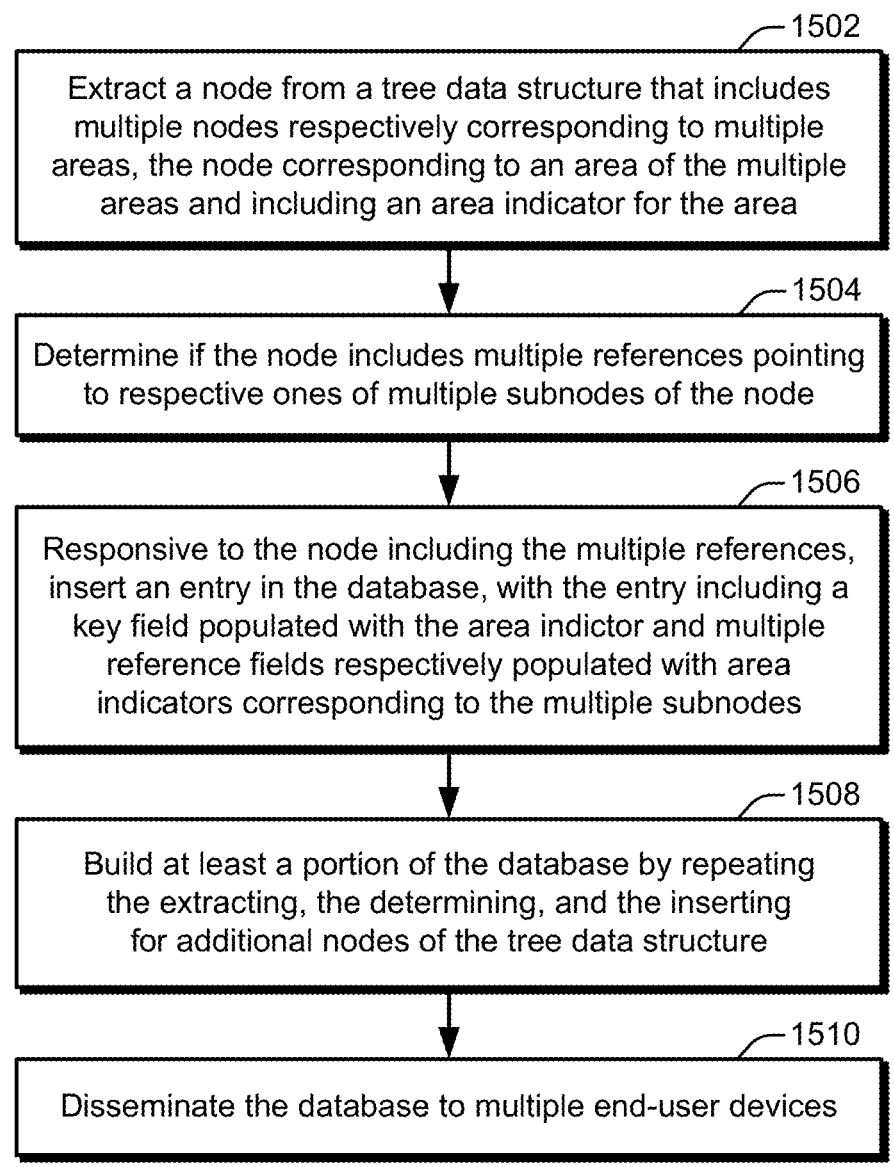
FIG. 15 is a flow diagram illustrating an example procedure in accordance with one or more example embodiments.

This section describes with reference to FIGS. 12-15 example procedures relating to facilitating location-aware analysis in one or more embodiments. The procedures of FIGS. 12-14 are depicted with flow charts. The procedure of FIG. 15 is depicted with a flow diagram. Aspects of the procedures may be implemented in hardware, firmware, or software, or a combination thereof. The procedures are shown as sets of blocks that specify operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an end-user device 102 that includes a POI database utilization module 112 or a server device 104 that includes a POI database production module 114 (e.g., of FIGS. 1, 8, and 9).

FIG. 12 is a flow chart illustrating an example procedure 1200 for constructing a POI tree data structure 600 from a POI data collection 120 that includes multiple POI descriptors 204. Performance of the procedure 1200, which includes operations 1202-1216, effectively inserts a POI descriptor 204 into a node 602 of the POI tree data structure 600 being constructed. At operation 1202, a POI tree construction module 802 retrieves a POI descriptor 204 from a POI data collection 120, with the POI descriptor 204 including a POI location 304. At operation 1204, the POI location 304 of the POI descriptor 204 is compared to an area indicator 608 of a node 602 of the tree data structure 600. If there is no match, then at operation 1216 a sibling node of the node 602 is selected, and another comparison is made at operation 1204 using the sibling node.

On the other hand, if there is a match at the comparison operation 1204, then at operation 1206 the POI tree construction module 802 determines if the node 602 includes nodal content 606. If the node 602 does not include nodal content 606, then at operation 1214 a subnode that is referenced by the node 602 is selected, and another comparison is made at operation 1204 using the selected subnode. However, if the node 602 is determined to include nodal content 606 at operation 1206, then at operation 1208 the POI descriptor 204 is added to the nodal content 606 of the node 602. At operation 1210, the node 602 is analyzed for potential content overflow. For example, if the number of POI descriptors 204 included with the node 602 exceeds a threshold maximum, then the POI tree construction module 802 spawns multiple subnodes for the node 602 and segments the area corresponding to the node 602 into a number of areas that equals the number of subnodes, such as four. The POI descriptors 204 are also redistributed across the multiple subnodes. At operation 1212, the POI tree construction module 802 repeats the operations of the procedure 1200 starting at the operation 1202 by retrieving a new POI descriptor 204.

FIG. 13 is a flow chart illustrating an example procedure 1300 for building a POI database 116 from a POI tree data structure 600. The procedure 1300 includes operations 1302-1316. At operation 1302, a node extraction module 810 extracts a node 602 from the POI tree data structure 600. At operation 1304, a POI database building module 806 formulates for the POI database 116 an entry 702 that corresponds to the extracted node 602. At operation 1306, the POI database building module 806 populates a key field 704 of the entry 702 with an area indicator 608 from the extracted node 602. At operation 1308, the type of the extracted node 602 is determined.

With reference also to FIG. 10, if the extracted node 602 is a reference node 602-6, then at operation 1310 a reference node processing module 814 populates multiple reference fields 706 of a reference entry 702-4 with area indicators 608 that respectively correspond to multiple subnodes of the extracted reference node 602-6. On the other hand, if the extracted node 602 is a content node 602-8, then at operation 1312 a content node processing module 812 populates a content field 708 of a content entry 702-5 with at least one POI descriptor 204 from nodal content 606 of the extracted content node 602-8. At operation 1314, the POI database building module 806 inserts the completed entry 702, such as the reference entry 702-4 or the content entry 702-5, corresponding to the extracted node 602 into the POI database 116. At operation 1316, a POI tree traversal module 804 recursively traverses the POI tree data structure 600 by extracting another node 602 at operation 1302 in accordance with inter-nodal pointers 616 of the POI tree data structure 600 to thereby repeat the procedure 1300.

FIG. 14 is a flow chart illustrating an example procedure 1400 for utilizing a POI database 116 as part of a location-aware analysis 118. The procedure 1400 includes operations 1402-1416. At operation 1402, a POI database search module 904 obtains a location 1102 for an end-user device 102. At operation 1404, the POI database search module 904 accesses an entry 702 of the POI database 116 as part of a POI searching analysis. With reference also to FIG. 11, at operation 1406, the POI database search module 904 determines if the accessed entry 702 includes one or more POI descriptors 204. If not, then at operation 1408 a match determination module 910 performs a matching operation 1110 on the reference fields 706 of the accessed reference entry 702-2 to determine which one or more area indicators 608 intersect with the location 1102. At operation 1410, using the matching area indicator 608 (e.g., the area indicator 608b) as a primary key search term, a key field search module 912 queries the POI database 116 to identify another entry 702 for continued POI searching analysis. This identified entry 702 is then accessed at operation 1404.

At operation 1406, if the accessed entry 702 is determined to include at least one POI descriptor 204, then at operation 1412 a content field parser module 914 extracts the POI descriptors 204 from the accessed content entry 702-3. At operation 1414, the POI database search module 904 determines if there are additional entries 702 to consider (e.g., if the location 1102 intersects with multiple area indicators 608 of the reference fields 706 from one or more entries 702). If so, the procedure 1400 continues at operation 1404 by accessing another entry 702 having at least one reference field 706 that has not yet been analyzed or tracked through the POI database 116. If there are no more entries 702 to analyze as determined at operation 1414, then at operation 1416 the POI relevance analysis module 906 performs a relevance determination operation on a listing of the extracted POI descriptors 204.

FIG. 15 is a flow diagram that includes five blocks 1502-1510 and that illustrates an example procedure 1500 for facilitating location-aware analysis in accordance with one or more example embodiments. At block 1502, a node is extracted from a tree data structure that includes multiple nodes respectively corresponding to multiple areas, with the node corresponding to an area of the multiple areas and including an area indicator for the area. For example, a POI tree data structure 600 can include multiple nodes 602 respectively corresponding to multiple areas. The POI database production module 114 can extract a node 602 from the tree data structure 600, with the extracted node 602 corresponding to an area of the multiple areas and including an area indicator 608 for the area. To do so, a node extraction module 810 may extract a node 602 having an area indicator 608 that describes a location 610 of the corresponding area, with the location 610 including a position 612 and a size indicator 614.

At block 1504, whether the node includes multiple references pointing to respective ones of multiple subnodes of the node is determined. For example, the POI database production module 114 can determine if the extracted node 602 includes multiple references 604 pointing to respective ones of multiple subnodes of the extracted node 602. The POI database building module 806 may, for instance, determine if the extracted node 602 is a reference node by inspecting the node for references 604 that serve as pointers 616 to subnodes of the extracted node 602.

At block 1506, responsive to the node including the multiple references, an entry is inserted into the database, with the entry including a key field populated with the area indictor and multiple reference fields respectively populated with area indicators corresponding to the multiple subnodes. For example, responsive to the extracted node 602 including the multiple references 604, the POI database production module 114 can insert an entry 702 in the POI database 116, with the entry 702 including a key field 704 populated with the area indictor 608 and multiple reference fields 706 respectively populated with area indicators 608 corresponding to the multiple subnodes of the extracted node 602. With reference to FIG. 10, the extracted node 602 may be determined to comprise a reference node 602-6. The POI database building module 806 may populate the key field 704 of a reference entry 702-4 with an area indicator 608c from the reference node 602-6. A reference node processing module 814 may populate multiple reference fields 706-1 to 706-4 of the reference entry 702-4 with respective area indicators 608 of the subnodes of the reference node 602-6. Thus, because the reference 604-4 of the reference node 602-6 points to the node 602-7, the reference node processing module 814 populates the reference field 706-4 of the reference entry 702-4 with the area indictor 608d of the node 602-7.

At block 1508, at least a portion of the database is built by repeating the extracting, the determining, and the inserting for additional nodes of the tree data structure. For example, the POI database production module 114 can build the POI database 116 by repeating the node extracting of block 1502, the determining of block 1504, and the inserting of block 1506 for additional ones of the multiple nodes 602 of the tree data structure 600. At block 1510, the database is disseminated to multiple end-user devices. For example, the POI database production module 114 can disseminate the POI database 116 to multiple end-user devices 102.

For additional example operations, whether the node includes at least one POI descriptor is ascertained. For example, the POI database production module 114 can ascertain whether the extracted node 602 includes at least one POI descriptor 204. The POI database building module 806 may, for instance, ascertain if the extracted node 602 includes nodal content 606 having multiple POI descriptors 204, with each POI descriptor 204 respectively corresponding to a POI 202 that is situated within the area that corresponds to the extracted node 602. Further, responsive to the node including the at least one POI descriptor, an entry is inserted into the database, with the entry including a key field populated with the area indicator and a content field populated with the at least one POI descriptor. For example, responsive to the extracted node 602 including the POI descriptor 204, the POI database production module 114 can insert an entry 702 in the POI database 116, with the entry 702 including a key field 704 populated with the area indicator 608 and a content field 708 populated with the POI descriptor 204. With reference to FIG. 10, the extracted node 602 may be ascertained to comprise a content node 602-8. The POI database building module 806 may populate the key field 704 of a content entry 702-5 with an area indicator 608e from the content node 602-8. A content node processing module 812 may populate a content field 708 of the content entry 702-5 with one or more POI descriptors 204 from the nodal content 606 of the content node 602-8.

Having described example procedures in accordance with one or more embodiments, consider now an example system and device that can be utilized to implement the various schemes and techniques described herein.

Example System and Device

Figure 16:
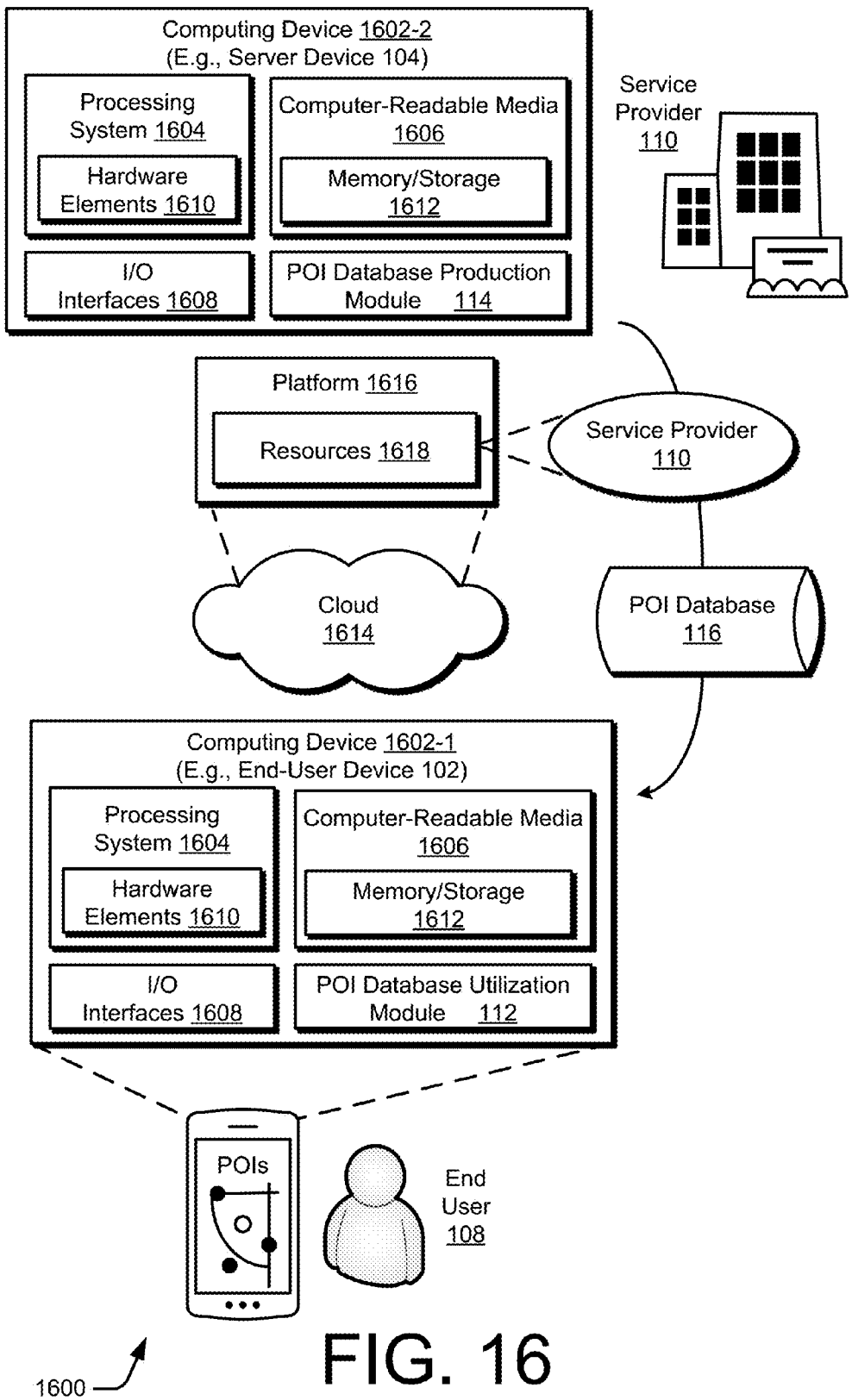
FIG. 16 illustrates an example system including various components of example devices that can be employed for one or more embodiments of facilitating location-aware analysis.

FIG. 16 illustrates an example system 1600 that includes example computing devices 1602 that are representative of one or more computing systems or computing devices that may implement the various techniques described herein. This is illustrated through the inclusion of a POI database production module 114 at the computing device 1602-2 and a POI database utilization module 112 at the computing device 1602-1, either or both of which may operate as described herein above, as well as by the inclusion of a POI database 116. A computing device 1602 may comprise an end-user device 102 of an end user 108, a server device 104 of a service provider 110, an on-chip system or system-on-a-chip (SOC), or any other suitable computing device or computing system. An example end-user device 102 is represented by the computing device 1602-1, and an example server device 104 is represented by the computing device 1602-2.

The example computing devices 1602 as illustrated include at least one processing system 1604, one or more computer-readable media 1606, and one or more I/O interfaces 1608 that may be communicatively coupled, one to another. Although not explicitly shown, the computing device 1602 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including one or more hardware elements 1610 that may be implemented as processors, functional blocks, and so forth. This may include implementation in hardware as an application specific integrated circuit (ASIC), a general-purpose processor, or other logic device formed using e.g. one or more semiconductors. The hardware elements 1610 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable media 1606 is illustrated as including memory/storage 1612. The memory/storage 1612 represents memory/storage capacity associated with one or more computer-readable media. The memory/storage component 1612 may include volatile media (e.g., random access memory (RAM)) or nonvolatile media (e.g., read only memory (ROM), flash memory, optical discs, or magnetic disks). The memory/storage component 1612 may include fixed media (e.g., RAM, ROM, or a fixed hard drive) or removable media (e.g., a flash memory card, a removable hard drive, or an optical disc). The computer-readable media 1606 may be implemented in a variety of other ways as further described below.

The input/output interface(s) 1608 are representative of functionality to allow a user to enter commands or information to computing device 1602 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a monitor, or a projector), a speaker, a printer, a network card, a haptic vibrating device, or a combination thereof. Thus, the computing device 1602 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1606 may include a variety of media that may be accessed by the computing device 1602. By way of example, and not limitation, computer-readable media may include "computer-readable storage media" or "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media may include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1602, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. For example, computer-readable signal media may include wired media, such as a wired network or direct-wired connection, or wireless media, such as acoustic, RF, microwave, infrared, or other wireless media.

As previously described, hardware elements 1610 and computer-readable media 1606 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1610. The computing device 1602 may be configured to implement particular instructions or functions corresponding to software or hardware modules. Accordingly, implementation of a module that is executable by the computing device 1602 as software may be achieved at least partially in hardware, e.g., through use of computer-readable storage media or the hardware elements 1610 of the processing system 1604. The instructions or functions may be executable/operable by one or more articles of manufacture (e.g., one or more computing devices 1602 or processing systems 1604) to implement techniques, modules, or examples described herein.

The techniques described herein may be supported by various configurations of the computing device 1602 and are not limited to the specific aspects of the example devices described herein. This functionality may also be implemented fully or partially through use of a distributed system, such as over a "cloud" 1614 via a platform 1616 as described below.

The cloud 1614 may include or represent a platform 1616 for resources 1618. The platform 1616 abstracts underlying functionality of hardware (e.g., one or more servers or at least one data center) and software resources of the cloud 1614. The resources 1618 may include applications or data that can be utilized while computer processing is at least partially executed on servers remote from, or distributed around, the computing device 1602. Resources 1618 may also include services provided over the Internet or through a subscriber network, such as a cellular or Wi-Fi network.

The platform 1616 may abstract resources and functions to connect the computing device 1602 with other computing devices or services. The platform 1616 may also serve to abstract a scaling of resources to provide a corresponding level of scale to encountered demand for the resources 1618 implemented via the platform 1616. Accordingly, in an interconnected device embodiment, implementation of functionality described herein may be distributed throughout the illustrated system of FIG. 16, or at least throughout the cloud 1614 along with the computing device 1602. For example, functionality may be implemented in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to facilitate location-aware analysis by enabling location-related data that is encoded with a tree mechanism to be persisted in a database, a method implemented by at least one computing device, the method comprising:
   extracting a node from a quadtree data structure that includes multiple nodes respectively corresponding to multiple areas, the node corresponding to an area of the multiple areas and including an area indicator for the area;
   determining if the node includes multiple references pointing to respective ones of multiple subnodes of the node;
   inserting an entry in a database by:
      responsive to the node including the multiple references, inserting the entry including a key field populated with the area indictor and multiple reference fields respectively populated with area indicators corresponding to the multiple subnodes; or
      responsive to the node not including the multiple references, inserting the entry including a content field and a key field populated with the area indicator;
   building at least a portion of the database by repeating the extracting, the determining, and the inserting for additional nodes of the quadtree data structure; and
   disseminating the database to multiple end-user devices.

2. The method as described in claim 1, wherein the inserting the entry in the database responsive to the node including the multiple references, with the entry including the key field populated with the area indictor and the multiple reference fields respectively populated with the area indicators corresponding to the multiple subnodes, comprises:
   traversing respective pointers between the node and the multiple subnodes of the node, each subnode including a respective area indicator corresponding to the subnode, the respective area indicator describing a respective location of an area corresponding to each respective subnode of the multiple subnodes;
   extracting the respective area indicator from individual subnodes of the multiple subnodes; and
   populating the multiple reference fields with respective ones of the extracted area indicators.

3. The method as described in claim 2, further comprising:
   populating a key field of respective ones of multiple entries of the database with respective ones of the extracted area indicators, each respective entry of the multiple entries corresponding to a respective subnode of the multiple subnodes.

4. The method as described in claim 1, further comprising:
   responsive to the node not including the multiple references, ascertaining if the node includes at least one point of interest (POI) descriptor; and
   populating the content field with the at least one POI descriptor.

5. The method as described in claim 1, wherein:
   multiple nodes of the quadtree data structure that include at least one reference pointing to one subnode include four references respectively pointing to four sibling subnodes; and
   each subnode of the four sibling subnodes corresponds to a rectangular area that is equal in size to rectangular areas of the other subnodes of the four sibling subnodes.

6. The method as described in claim 1, wherein the area indicator for the area corresponding to the node comprises a description of a boundary of the area corresponding to the node.

7. The method as described in claim 1, further comprising:
   obtaining a POI data collection, the POI data collection including multiple POI descriptors that respectively include multiple POI locations; and
   constructing the quadtree data structure based on the multiple POI descriptors of the POI data collection, including:

retrieving a POI descriptor from the POI data collection, the POI descriptor including a POI location;

comparing the POI location of the POI descriptor to an area indicator of a node of the quadtree data structure to determine a match result or a non-match result;

for the match result, responsive to the node including nodal content, adding the POI descriptor to the nodal content of the node and repeating from the retrieving with another POI descriptor; or responsive to the node lacking nodal content, continuing from the comparing using a subnode that is referenced by the node; and for the non-match result, continuing from the comparing using a sibling node of the node.

8. At least one computing device operative in a digital medium environment to facilitate location-aware analysis by enabling location-related data that is encoded with a tree mechanism to be persisted in a database, the at least one computing device comprising:

a database building module configured to build a point of interest (POI) database based on a quadtree data structure that includes multiple nodes respectively corresponding to multiple areas, at least one node of the quadtree data structure including four references respectively pointing to four sibling subnodes, the database building module including:

a content node processing module configured to insert an entry in the POI database for a content node, the entry including a key field populated with an area indicator for an area corresponding to the content node and a content field populated with at least one POI descriptor included with the content node; and a reference node processing module configured to insert an entry in the POI database for a reference node, the entry including a key field populated with an area indictor for an area corresponding to the reference node and multiple reference fields respectively populated with area indicators corresponding to multiple subnodes of the reference node.

9. The at least one computing device as described in claim 8, wherein the area comprises a spatial area, and the area indicator for the area comprises an identification of a position of the spatial area.

10. The at least one computing device as described in claim 9, wherein the area indicator for the area comprises an indication of a size of the spatial area.

11. The at least one computing device as described in claim 9, wherein the area indicator for the area comprises at least one value that is derived from one or more geospatial coordinates indicative of a position, a length, or a width of the spatial area.

12. The at least one computing device as described in claim 8, further comprising:

a tree traversal module configured to traverse the quadtree data structure including the multiple nodes, the multiple nodes comprising reference nodes that include multiple references respectively pointing to multiple subnodes and content nodes that include at least one POI descriptor, the tree traversal module including:

a node extraction module configured to extract nodes from the quadtree data structure by following references from nodes to subnodes.

13. The at least one computing device as described in claim 8, wherein:

the POI database comprises a POI relational database;

the entry for the content node comprises a tuple of the POI relational database, and the entry for the reference node comprises another tuple of the POI relational database;

the tuple of the POI database comprises a row in the POI relational database;

the other tuple of the POI database comprises another row in the POI relational database; and the area indicator populating each key field comprises a unique key to distinguish each corresponding row of the POI relational database from other rows of the POI relational database.

14. The at least one computing device as described in claim 8, wherein each reference field of the multiple reference fields comprises a self-referential database field such that a given area indicator populating a given reference field of the entry that corresponds to the reference node also populates a key field in another entry that corresponds to a subnode of the multiple subnodes after the other entry is inserted into the POI database.

15. The at least one computing device as described in claim 8, wherein the area indicators populating the multiple reference fields of the entry for the reference node correspond to respective subareas that are at least substantially contained within the area corresponding to the area indicator populating the key field of the entry for the reference node.

16. At least one computing device operative in a digital medium environment to facilitate location-aware analysis by enabling location-related data that is encoded with a tree mechanism to be used in a persistent database form, the at least one computing device comprising:

a point of interest (POI) service interaction module configured to receive a POI database including multiple entries respectively corresponding to multiple areas, each entry including a key field populated with an area indicator for an area corresponding to the entry; and a POI database search module configured to search the POI database to ascertain multiple points of interest (POIs) with regard to a location of the at least one computing device, the POI database search module including:

a match determination module configured to analyze a reference entry of the POI database to determine a reference field that is populated with an area indicator that matches the location;

a key field search module configured to search key fields of the multiple entries of the POI database using the matching area indicator to identify another entry for search analysis; and a content field parser module configured to extract one or more POI descriptors from a content field of a content entry of the POI database if a key field of the content entry includes the matching area indicator.

17. The at least one computing device as described in claim 16, further comprising:

a POI relevance analysis module configured to:

determine respective distances between the at least one computing device and the multiple POIs using POI locations obtained from the extracted POI descriptors; and rank the multiple POIs based on the respective distances to produce a ranked listing of POIs; and a POI reporting module configured to report the ranked listing of POIs.

18. The at least one computing device as described in claim 16, wherein:

the location of the at least one computing device is represented by a bounding rectangle; and the match determination module is configured to determine a location match based on whether the bounding rectangle intersects with a given area indicator.

19. The at least one computing device as described in claim 18, wherein the match determination module is configured to compute a size of the bounding rectangle based on at least one of a size of a POI or a size of a travel range for the at least one computing device.

20. The at least one computing device as described in claim 16, wherein the POI database has a quadtree data structure with at least one node including four references respectively pointing to four sibling subnodes.

* * * * *